(12) United States Patent
Colony et al.

(10) Patent No.: US 9,751,018 B2
(45) Date of Patent: Sep. 5, 2017

(54) COMPUTER-IMPLEMENTED METHODS AND SYSTEMS ENABLING FAN PARTICIPATION IN CALLING PLAYS AT SPORTING AND OTHER EVENTS

(71) Applicant: Your Call, Inc., Newton, MA (US)

(72) Inventors: George F. Colony, Concord, MA (US); Julie H. Meringer, Belmont, MA (US); Susan D. Membrino, West Newton, MA (US); William Packard Colony, Brookline, MA (US)

(73) Assignee: Your Call, Inc., Newton, MA (US)

( * ) Notice: Subject to any disclaimer, the term of this patent is extended or adjusted under 35 U.S.C. 154(b) by 206 days.

(21) Appl. No.: 14/575,698

(22) Filed: Dec. 18, 2014

(65) Prior Publication Data
US 2015/0174467 A1 Jun. 25, 2015

Related U.S. Application Data

(60) Provisional application No. 61/918,350, filed on Dec. 19, 2013.

(51) Int. Cl.
*A63F 13/00* (2014.01)
*A63F 13/812* (2014.01)
(Continued)

(52) U.S. Cl.
CPC ........ *A63F 13/812* (2014.09); *A63F 13/2145* (2014.09); *A63F 13/25* (2014.09);
(Continued)

(58) Field of Classification Search
CPC ......... A63F 13/30; A63F 13/55; A63F 13/812
(Continued)

(56) References Cited

U.S. PATENT DOCUMENTS

| 4,496,148 A | 1/1985 | Morstain et al. |
| 4,592,546 A | 6/1986 | Fascenda et al. |

(Continued)

FOREIGN PATENT DOCUMENTS

| WO | WO-9419906 A1 | 9/1994 |
| WO | WO-2009/043024 A1 | 4/2009 |

OTHER PUBLICATIONS

Associated Press, "Fans Get Big Chance Napoleon Coach Accepts Play-Calling Help," The Blade, Toledo, Ohio, Oct. 26, 1972, retrieved online at [URL:<<https://news.google.com/newspapers?id=6-hOAAAAIBAJ&sjid=9QEEAAAAIBAJ&dq=football%20play%20calling%20by%20fans&pg=7298%2C2715211>>] on Jun. 18, 2015 (2 pages).

(Continued)

*Primary Examiner* — James S McClellan
(74) *Attorney, Agent, or Firm* — Wilmer Cutler Pickering Hale and Dorr LLP

(57) ABSTRACT

A computerized method and system of facilitating state-based participation in calling plays in a football game thereby allowing fans to proactively participate in real-time in the game with players, referees and coaches. A computing device receives a user profile corresponding to a user registered to vote in a real-time football game. A sequence of states occurring in 100 seconds or less is initiated in response to a start of a play during the real-time football game. The sequence of states includes receiving a submission of a set of plays from a coach, sending the set of plays to a registered user, and receiving a vote from the registered user. A result of a real-time play based on the winning play is received and the coach is score updated by comparing the vote with the winning play and with the result of the real-time play.

20 Claims, 75 Drawing Sheets

(51) Int. Cl.
| | |
|---|---|
| G06Q 50/34 | (2012.01) |
| A63F 13/2145 | (2014.01) |
| A63F 13/25 | (2014.01) |
| A63F 13/32 | (2014.01) |
| A63F 13/332 | (2014.01) |
| A63F 13/335 | (2014.01) |
| A63F 13/92 | (2014.01) |

(52) U.S. Cl.
CPC ............ *A63F 13/32* (2014.09); *A63F 13/332* (2014.09); *A63F 13/335* (2014.09); *A63F 13/92* (2014.09); *G06Q 50/34* (2013.01); *A63F 2300/1075* (2013.01)

(58) Field of Classification Search
USPC .......................................................... 463/42
See application file for complete search history.

(56) References Cited

U.S. PATENT DOCUMENTS

| | | | |
|---|---|---|---|
| 4,722,526 | A | 2/1988 | Tovar et al. |
| 4,745,468 | A | 5/1988 | Von Kohorn |
| 5,036,389 | A | 7/1991 | Morales |
| 5,365,266 | A | 11/1994 | Carpenter |
| 5,465,384 | A | 11/1995 | Bejan et al. |
| 5,508,731 | A | 4/1996 | Kohorn |
| 5,668,859 | A | 9/1997 | Salimando |
| 5,860,862 | A | 1/1999 | Junkin |
| 5,993,314 | A | 11/1999 | Dannenberg et al. |
| 6,134,531 | A | 10/2000 | Trewitt et al. |
| 6,293,868 | B1 | 9/2001 | Bernard |
| 7,743,070 | B1 | 6/2010 | Blumberg |
| 2002/0119823 | A1 | 8/2002 | Beuscher |
| 2006/0246973 | A1* | 11/2006 | Thomas .................. A63F 13/42 463/4 |
| 2008/0268929 | A1 | 10/2008 | Billmaier et al. |
| 2009/0137298 | A1 | 5/2009 | Bedingfield, Sr. et al. |
| 2009/0143124 | A1* | 6/2009 | Hughes .................. A63F 13/10 463/2 |
| 2009/0156280 | A1 | 6/2009 | Sweary et al. |
| 2010/0069149 | A1 | 3/2010 | Kisenwether et al. |
| 2010/0080390 | A1* | 4/2010 | Daniel .................. A63B 71/06 380/271 |
| 2013/0060362 | A1* | 3/2013 | Murphy .................. A63F 13/65 700/93 |
| 2013/0139068 | A1* | 5/2013 | Bowring ............ A63B 71/0616 715/747 |
| 2013/0316837 | A1* | 11/2013 | Coiner, Jr. ........ G06F 17/30398 463/43 |
| 2015/0248817 | A1 | 9/2015 | Steir et al. |

OTHER PUBLICATIONS

Crothers, "Flash-Card Football and More Here's a Man Crazy Enough to Let Fans Call Grid Plays," The Vault, Dec. 10, 1990, retrieved online at [URL:<<http://www.si.com/vault/1990/12/10/123260/flash-card-football-and-more-heres-a-man-crazy-enough-to-let-fans-call-grid-plays>>] on Jun. 18, 2015 (2 pages).

Didinger, "So, You Think You Can Coach Lurie: Computers to Link Fans, Games," Philly.Com, Jul. 7, 1994, retrieved online at [URL:<<http://articles.philly.com/1994-07-07/sports/25843847_1_eagles-owner-jeffrey-lurie-interactive-network-computer-program>>] on Jun. 18, 2015 (4 pages).

International Search Report and Written Opinion issued by the United States Patent and Trademark Office as International Searching Authority for International Patent Application No. PCT/US14/71271 mailed Mar. 20, 2015 (9 pages).

Johnson, "Just by Staying Home, Fans in the 21st Century will Become Part of the Action," Sports in the Year 2001, SI Vault, retrieved online at [URL:<<http://sportsillustrated.cnn.com/vault/article/magazine/MAG1140016/index/index.htm>>] on Mar. 28, 2013 (6 pages).

Tomasson, "Hatfield Not Main Problem in Tigertown," Herald-Journal, Spartanburg, S.C., Nov. 18, 1993, retrieved online at [URL:<<https://news.google.com/newspapers?id=UDcfAAAAIBAJ&sjid=JM8EAAAAIBAJ&dq=football%20fans%20call%20plays%20electronic&pg=6437%2C961541>>] on Jun. 18, 2015 (2 pages).

Walters, "Two-Fisted TV Football with QB1, Players Pit Their Play-Calling Skills Against Those of Bar Patrons Across the U.S.," The Vault, Feb. 8, 1993, retrieved online at [URL:<<http://www.si.com/vault/1993/02/08/128033/two-fisted-tv-football-with-qb1-players-pit-their-play-calling-skills-against-those-of-bar-patrons-across-the-us>>] on Jun. 18, 2015 (2 pages).

Weaver, "Pokey Having Blast Coaching Portland State," The Spokesman-Review, Spokane, Washington, Sep. 12, 1992, retrieved online at [URL:<<https://news.google.com/newspapers?id=t1tWAAAAIBAJ&sjid=SPADAAAAIBAJ&pg=6360%2C528212>>] on Jun. 18, 2015 (2 pages).

International Search Report and Written Opinion dated May 23, 2017, in related International Application No. PCT/US2017/022123 filed Mar. 13, 2017, 12 pages.

Extended European Search Report dated Jul. 4, 2017 in related European Patent Application No. 14871708.5, (9 pages).

\* cited by examiner

FIG. 49

Plays

Play     GUN RED RT F SHORT

Nickname  16 Power

Number

Basic Name  4901

Type  Split Flow Run Off Gu | Run

Fan Playbook Description  4902

4903

Attach simple play diagram

Fans Participating

Trouble shoot tech/marketing alert

Fan ID #   #6
Game/Play #   Puma/AAA

Tech Support   Yes, can't resolve
Marketing Alert   Retention plan activated
Other issues/items:

Attach simple play diagram

COMPUTER-IMPLEMENTED METHODS AND SYSTEMS ENABLING FAN PARTICIPATION IN CALLING PLAYS AT SPORTING AND OTHER EVENTS

CROSS REFERENCES TO RELATED APPLICATIONS

This application claims priority under 35 U.S.C. 119(e) to U.S. Provisional Application No. 61/918,350, filed Dec. 19, 2013, entitled "Computer-Implemented Methods and Systems Enabling Fan Participation in Calling Plays at Sporting and Other Events," the contents of which are hereby incorporated by reference in their entirety.

BACKGROUND

The present application relates generally to live events and, more particularly, methods and systems for enabling fans or audience members to participate in calling plays at football games and other events.

While traditional applications of technology for user participation in live events exist, they are generally passive forms of user participation. For example, some traditional entertainment shows allow fans to vote for a winner, but results are not shown until the end of a show, or days or weeks later. Fans can help decide which entertainer 'wins', but fans do not decide what activity occurs from minute-to-minute. Fans have minimal real-time impact on the real-time action.

In the context of sporting events, traditional applications allow users to participate in a fantasy game, where they can choose players and teams, and compete based on statistics corresponding to real time events in the sporting events. While real time events can affect a user's score or standing in traditional applications, the user has no ability to participate or influence real time events.

SUMMARY

Systems and methods are disclosed for facilitating state-based participation in calling plays in a football game thereby allowing fans to proactively participate in real-time in the game with players, referees and coaches. In some aspects, the systems and methods comprise receiving, by a computing device, a user profile, the user profile corresponding to a user registered to vote in a real-time football game, the user profile comprising a coach score. In some aspects, the systems and methods comprise initiating, by the computing device, a sequence of states in response to a start of a play during the real-time football game. In some aspects, the sequence of states comprise a poll creation state for a first time period, the poll creation state comprising receiving, by the computing device, a submission of a set of plays from a computing device associated with a coach at a time corresponding to a time prior to an execution of a play in the real-time football game; a notification state for a second time period, the notification state comprising sending, by the computing device, the set of plays to a computing device associated with a registered user in a format such that the sets of plays automatically display upon the registered user device; a fan voting state for a third time period, the fan voting state comprising receiving, by the computing device, a vote from the registered user device, the vote corresponding to one play from the set of plays; a notification state for a fourth time period, the notification state comprising sending, by the computing device, a winning play to the registered user device and the coach device, the winning play based on results of the vote, such that a sum of the first time period, second time period, third time period, and fourth time period is equal to or less than 100 seconds; and a play in action state for a fifth time period, the play in action state comprising receiving, by the computing device, a result of a real-time play based on the winning play from a computing device associated with at least one of a referee and an administrator. In some aspects, the systems and methods comprise updating, by the computing device, the user score by comparing the vote with the winning play and with the result of the real-time play; and outputting, by the computing device, content to the registered user device related to the coach score.

In some aspects, the sequence of states terminates upon the start of a subsequent state. In some aspects, the submission of the set of plays further comprises a coach override, the coach override comprising a winning play selected by the coach. In some aspects, the poll creation state further comprises creating at least one of: a random set of plays, a set of plays based on prior game statistics, and a set of plays based on current game statistics, when the submitted set of plays comprises no plays. In some aspects, the content comprises a winning play score, the winning play score corresponding to a number of times a play selected by the user, from the set of plays associated with the poll creation state, is the winning play. In some aspects, the content further comprises at least one of a participation score and a scoring play score, the participation score corresponding to a number of plays where the user submits a vote, the scoring play score corresponding to a number of times a play selected by the user results in a team associated with the voting scoring a goal or preventing the scoring of a goal. In some aspects, the content comprises at least one of voting information, challenges, and education information, the voting information comprising a record corresponding to how a user earned the coach score, the challenges comprising comparing the coach score with coach scores corresponding to other user profiles, the education information comprising at least one of information and an activity to improve the coach score. In some aspects, the systems and methods comprise sending, by the computing device, state information to the referee device. In some aspects, the systems and methods comprise receiving, by the computing device, a duration of at least one of the first time period, second time period, third time period and fourth time period from the referee device. In some aspects, the systems and methods comprise outputting, by the computing device, live game information to at least one of the user device, the coach device, and the referee device. In some aspects, the sum of the time periods ranges from 30 seconds to 60 seconds.

DETAILED DESCRIPTION

When football fans watch a football game, either live or on television, they have no involvement in how the game is played. They know little about the plays the coach of their team is picking to execute on the field, and have no ability to influence the coach's play choices. Various embodiments disclosed herein are directed to computer-implemented methods and systems for increasing fan involvement in games by enabling fans to actively participate in calling plays at football games.

As will be discussed in greater detail below, in accordance with various embodiments, a computer-implemented live-game system or engine is provided that enables fans of a team to collectively decide in real-time which plays should be executed by their team during a game. For each play, the coaches of the teams pick a set of possible plays, which the fans vote on. The system tabulates the fan votes, and the winning play can be executed on the field in real-time. The system provides users with access to a wide variety of information needed to participate in the system including information on plays, player rosters, teams, stats etc. The system also tracks each fan's coaching performance (e.g., the % of times the fan's play choice was the winning play, the % of times the fan's play succeeded (scored, achieved first down, gained certain yardage), or the % of times the fan's play selection likely would have been a better choice given the poor performance of the actual play run on the field, etc.). The system also enables fans to compete against one another, individually or in leagues, in their coaching skills.

While the exemplary embodiments illustrated herein relate to the game of American football, this is by way of example only. It should be understood that the methods and systems for increasing fan participation are not limited to football, and may also be applied to other live events such as, e.g., soccer, baseball, golf, hockey, basketball, movie screenings, game shows, award shows, sales meetings, political events, and business conferences.

Figure 1:
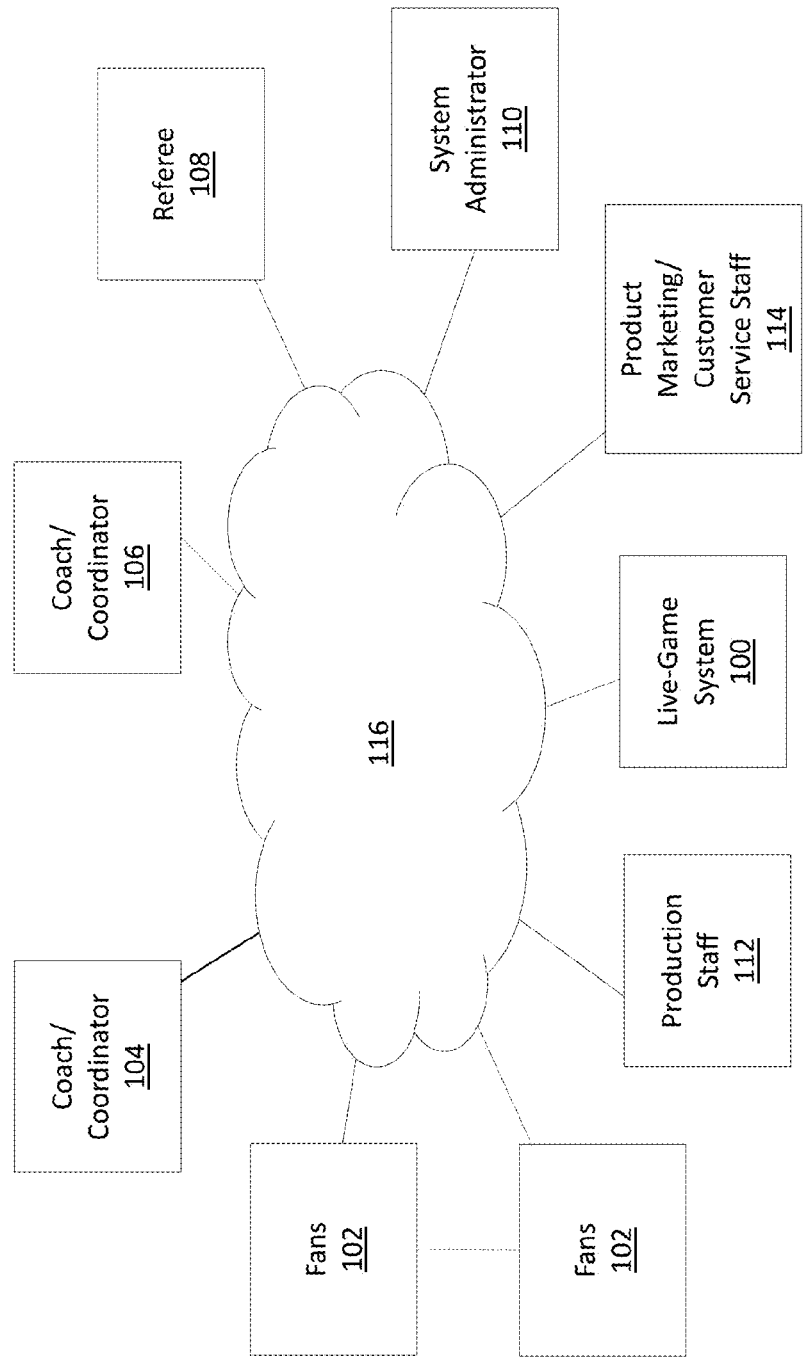
FIG. 1 is a simplified block diagram illustrating an exemplary network in which a live-game engine or system may be implemented, according to some embodiments of the present disclosure.

FIG. 1 illustrates an exemplary network, in which a live-game system 100 may be implemented, according to some embodiments of the present disclosure. The live-game system 100 can be implemented in a computer server system, which communicates with a plurality of client devices operated by the users of the system 100, including fans 102, the coaches/coordinators 104, 106 of the teams playing the game, referees 108, and system administrators 110. Other users of the system can include production staff 112 and product marketing/customer service staff 114.

The client devices communicate with the system 100 over a communications network 116. The communications network 116 can include any network or combination of networks including, without limitation, the Internet, a local area network, a wide area network, a wireless network, and a cellular network.

The client devices operated by users to access the live-game system 100 can include any computing device that can communicate with the computer server system including, without limitation, personal computers (including desktop, notebook, and tablet computers), smart phones (e.g., Apple-based smart phones and Android-based smart phones), wearable computer devices (e.g., smart watches and smart glasses), cell phones, personal digital assistants, and other mobile devices. The client devices include operating systems (e.g., Android, Apple iOS, and Windows Phone OS, among others) on which applications run. The operating systems allow programmers to create applications (often called "Apps") to provide particular functionality to the devices.

A representative client device can include at least one computer processor and a storage medium readable by the processor for storing applications and data. The client device also can include input/output devices, one or more speakers for acoustic output, a microphone for acoustic input, and a display for visual output, e.g., an LCD or LED display, which may have touch screen input capabilities.

Figure 2:
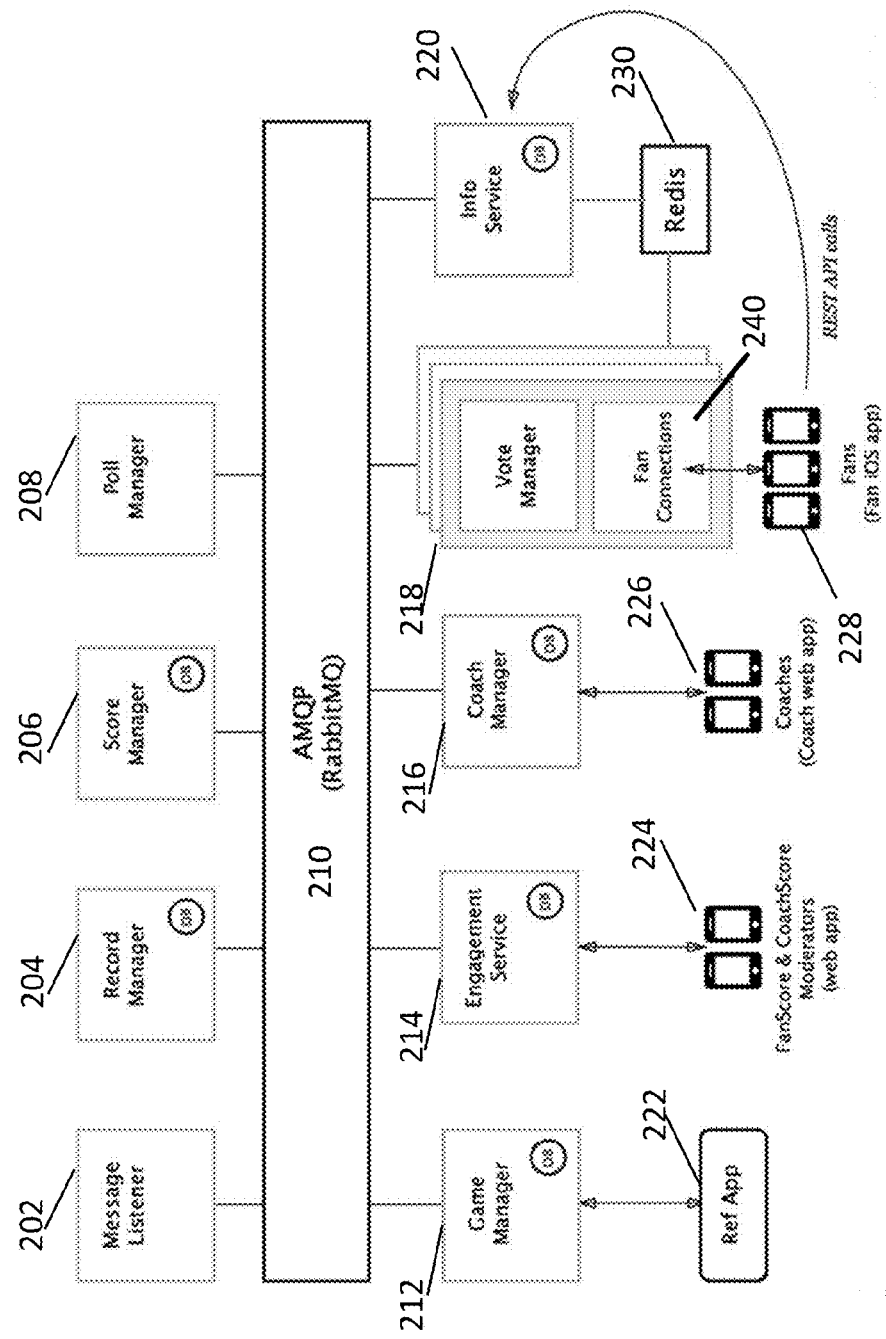
FIG. 2 is a block diagram illustrating system architecture, according to some embodiments of the present disclosure.

FIG. 2 is a block diagram illustrating system architecture, according to some embodiments of the present disclosure. FIG. 2 shows a message listener 202, record manager 204, score manager 206, poll manager 208, Advanced Message Queuing Protocol (AMQP) 210, game manager 212, engagement service 214, coach manager 216, vote manager 218, information service 220, referee application 222, moderator devices 224, coach devices 226, fan devices 228, database 230, and fan connections.

Message listener 202 is active software built into the system. It provides asynchronous event handling that defines the initial action to be taken as each message arrives. Different actions may be defined for different message types.

Record manager 204 includes a database for storing user voting records (e.g., votes during a game). The database can include any physical database or cloud-based data storage (e.g., Mongo database instance).

Score manager 206 includes a database for storing game statistics (e.g., wins, losses, play executed during a game). The database can include any physical database or cloud-based data storage (e.g., Mongo database instance).

Poll manager 208 controls state logic for polling. As described in more detail, polling can include a series of discrete states.

AMQP 210 comprises an Advanced Message Queuing Protocol (e.g., RabbitMQ). AMQP can support a variety of protocols and includes message orientation, queuing, and routing.

Game manager 212 includes a database for storing real-time events and statistics during a game. The database can include any physical database or cloud-based data storage (e.g., Mongo database instance). Game manger 212 can communicate with Ref App 222. As described in more detail below, game manager 212 can send Ref App 222 real-time data corresponding to a game. Ref App 222 can send instructions to Game Manager 212, based on the real-time data, to update state information (e.g., state information for polling) and information for display on one or more coach device 226 or fan device 228.

Engagement service 214 represents multiple discreet services that coordinate elements of the game experience. These services include a user interface, logic, and storage. One of the services, FanScore Moderator 224, stores the data behind multiple question-and-answer games (e.g., the name of each game, one to one-thousand questions, timing logic associated with answers for each of the questions, and tips for each of the questions). A person operating the FanScore Moderator can define a game, initiate a game, and trigger the delivery of each question (e.g., the first question is sent 10 minutes before kickoff, the second question during the first timeout), and identify the recipients of each question (e.g., all registered fans or fans voting with only one of the two teams). Another service, CoachScore Moderator 224, allows an operator to evaluate the results of plays run on the field in real time (e.g., declaring an error on a play and assessing the success of the play run on the field). These evaluations are then used to create each Fan's CoachScore.

Coach manager 216 includes a database for storing coaching records (e.g., information about plays, players, scheduling) and other data that is used in multiple devices across the system. The database can include any physical database or cloud-based data storage (e.g., Mongo database instance). Coach manager 216 is in communication with a coach application 226. Coach manager 216 can display information in the database to the coach device and receive edits and changes from the coach device to information in the database.

Vote manager 218 coordinates voter polling. Vote manager 218 maintains the logic for communication and controls that communication with fan devices 228 via fan connections 240. Fan Connections 240 declares and manages the communication channel used with fan devices. Vote manager 218, through a fan connection module, can push a poll to fan device 228 and receive results from the poll.

Fan device 228 represents the mobile devices used by fans to participate in calling plays. The Info Service 220 includes web services that execute key processes (e.g., retrieving fan profile information, updating playbook information in fan apps, etc.). The information service refers to a fast, in-memory data store 230 (e.g., Redis).

Figure 3:
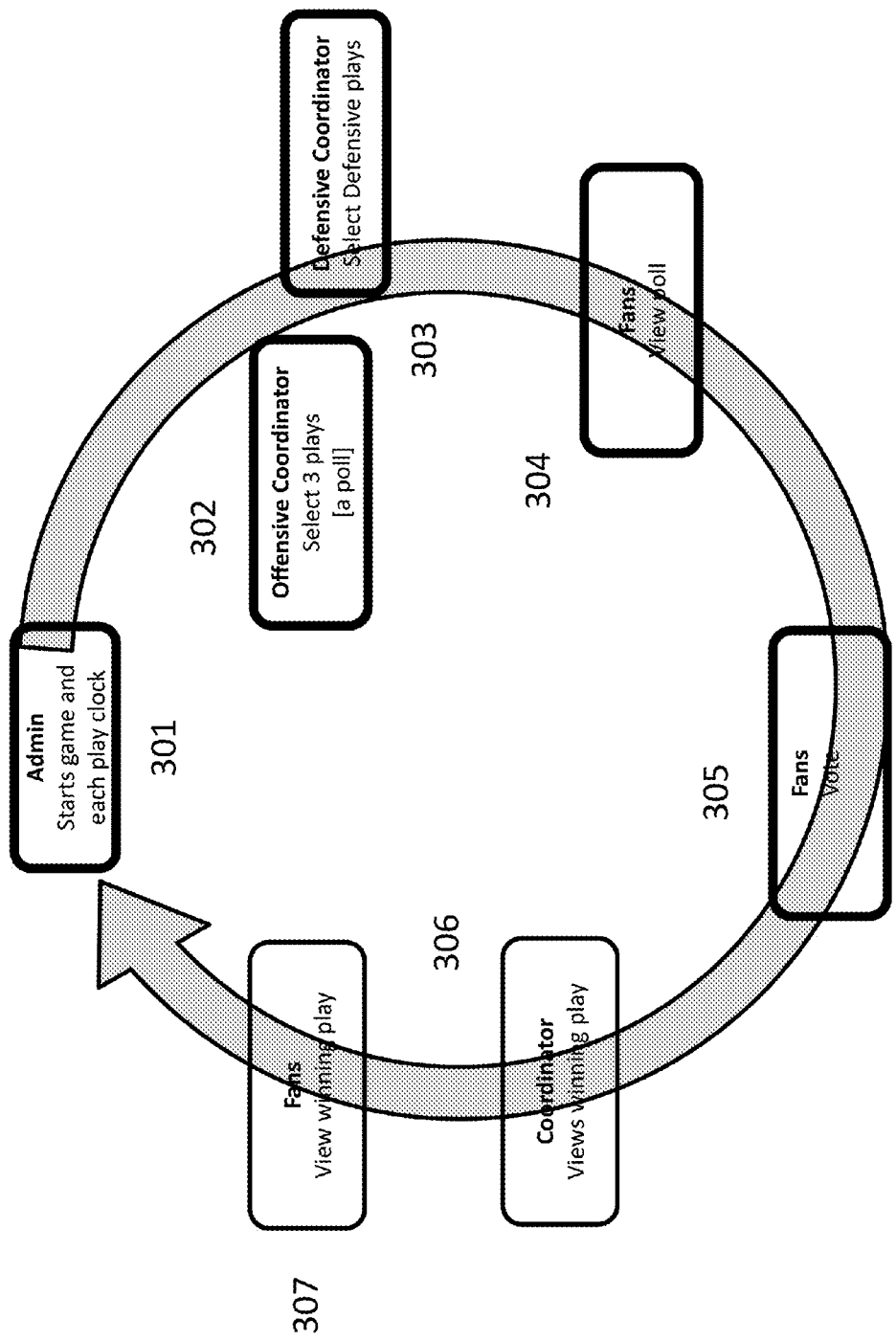
FIGS. 3 and 4 are flow diagrams illustrating an exemplary play voting cycle, according to some embodiments of the present disclosure.
Figure 4:
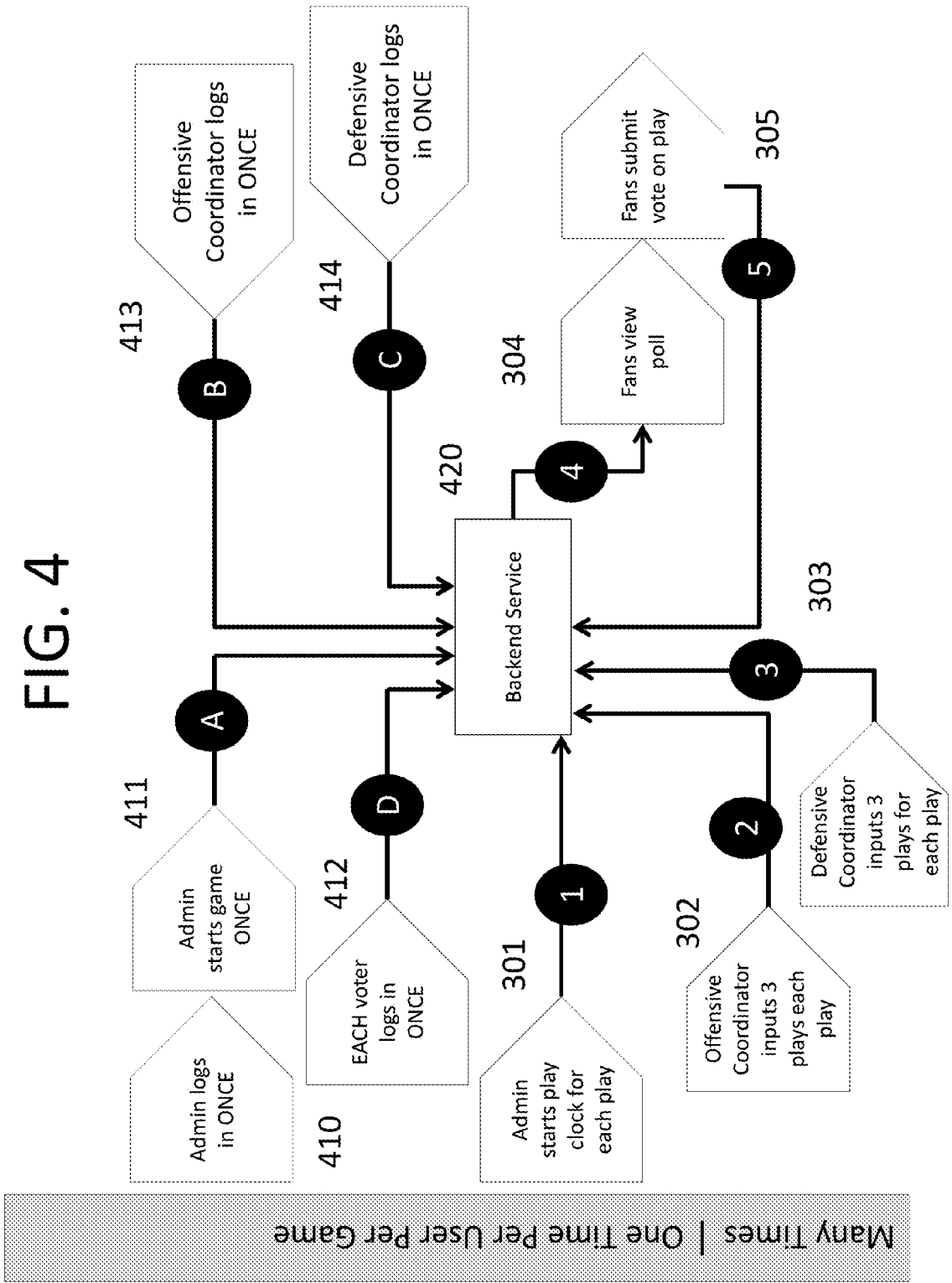

FIGS. 3 and 4 are flow diagrams illustrating an exemplary play voting cycle, according to some embodiments of the present disclosure. Referring to FIG. 4, prior to a game, each of the entities in the system logs in once to backend service 420. Backend service is described in more detail above in FIG. 2. The entities include admin 410, a voter 412, offensive coordinator 413, and defensive coordinator 414. Admin, at the start of the game, can send an instruction to the backend service 420 to start the game 411. For each play, the process starts with the administrator starting a play clock 301. In some embodiments, an administrator starts each game, starts each play clock, and identifies each possession switch (e.g., when possession of the ball transfers from one team to the other). The coaches of each team are given a predetermined amount of time (e.g., 1-60 seconds, preferably 7 seconds) to pick a set of possible plays to be voted on by the fans. The offensive coordinator can select a set of plays 302, and a defensive coordinator can select a set of plays 303. In some embodiments, the offensive coordinator and defensive coordinator each select 3 plays. The plays are pushed out via push technology (preferably no manual refresh on the fans app is needed) to fans who have registered with the system. Fans are then able to view the poll 304. Fans are then given a preset time period (e.g., 1 to 60 seconds, preferably 10 seconds) to vote on the play they want their team to execute 305. The fan votes are sent to a system database and tabulated. The winning results are sent to the coaches 306. The results can also be sent to the fans at the same time, again preferably via push technology 308. Coaches then radio or otherwise communicate the winning play to the personnel on the field, and the fans and coaches get to see the winning play executed on the field in real-time. The process described above can then start again for a subsequent play.

The system provides users with access to a wide variety of information needed to participate in the system including information on plays, player rosters, teams, stats etc.

Fans

Figure 5:
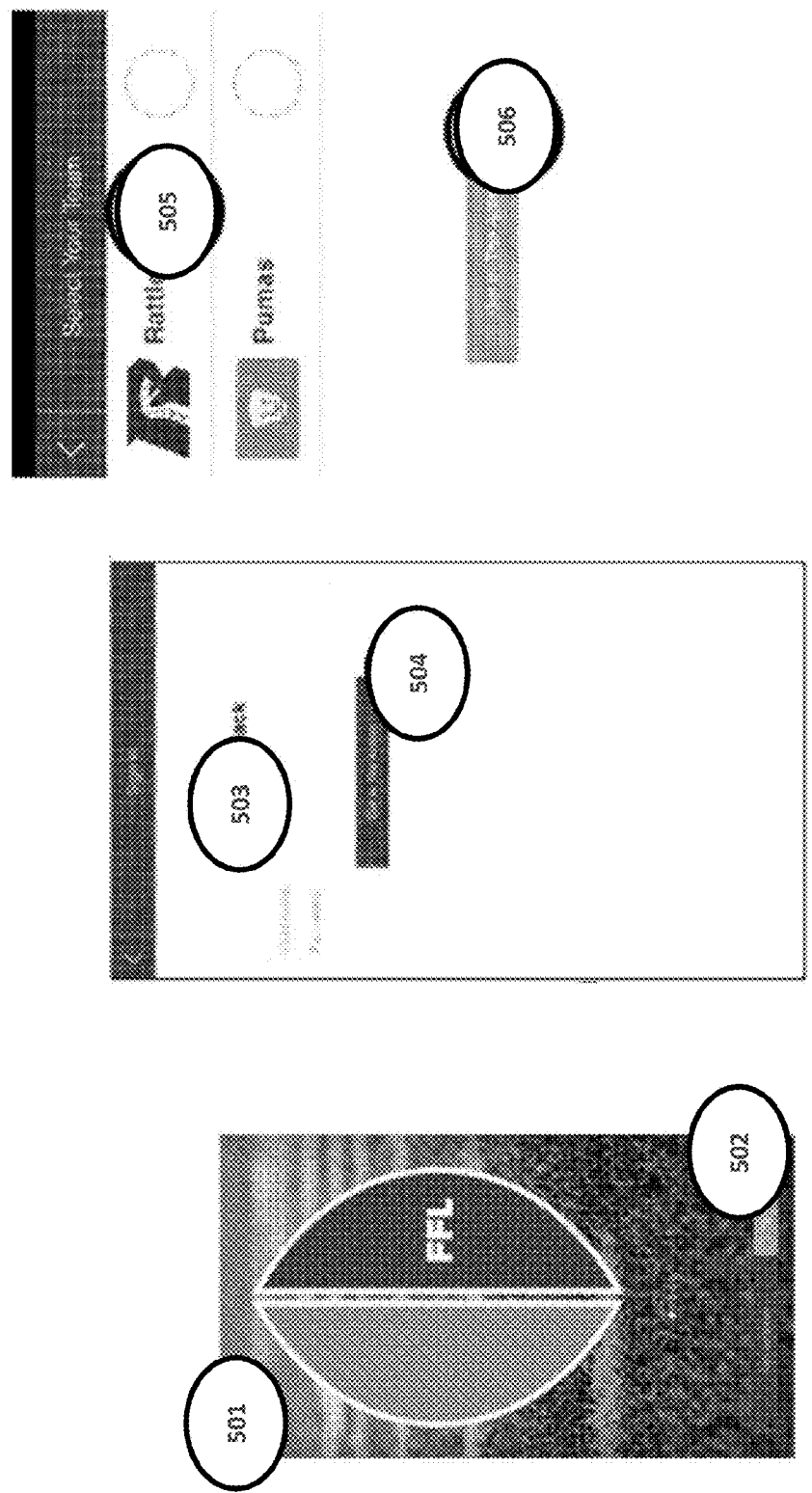
FIGS. 5-74 are exemplary screenshots illustrating operation of the live-game system, according to some embodiments of the present disclosure.

In one or more embodiments, fans can download a Fan App on their client devices to access the system. FIG. 5 shows an exemplary screenshot from the Fan App enabling users to register and login 503 to the system, according to some embodiments of the present disclosure. A user can access a unique URL 501 and sign in using his/her username and password by clicking a "sign in" button 502. During the registration process, a user will enter his or her name and choose a user name and password that will identify the user whenever using the system. Users can also enter in secure information, including a credit card and billing address information if they are going to sign up for a premium or paid product. Users can click on a "get in the action" button 504 to be directed to a team page where they will also be asked to choose which team they are a fan of 505, or they can go in and look at team information before they decide. They can click a button 506 to decide on a team once they review team information.

Figure 6:
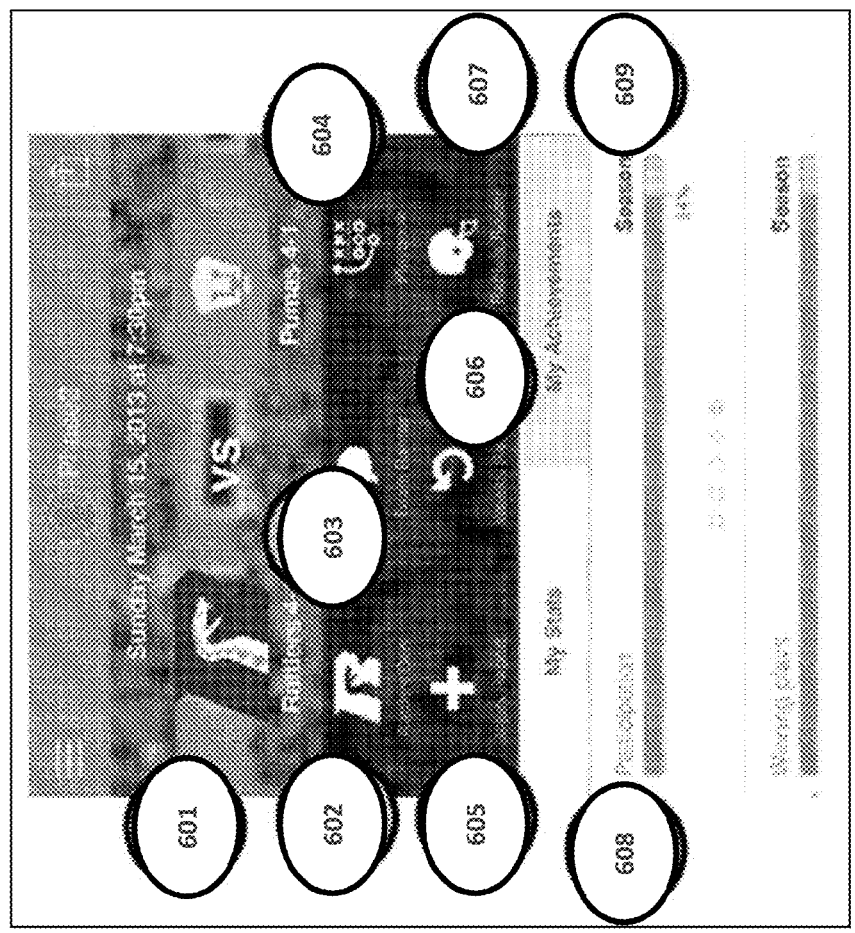

Fans who are registered and logged in can enter a Fan App Dashboard as illustrated in the exemplary screenshot of FIG. 6. The dashboard provides fans with access to a variety of content items (illustrated in FIGS. 7-14) they can use to participate in the live-game system. For example, Fan App Dashboard can include a header 601, which displays details about a coming game before the start of a game. As described in more detail below, Fan App Dashboard can also include rattlers den 602, team banter 603, playbook 604, injury report 605, weekly recap 606, player roster 607, my stats 608, and my achievements 609.

Figure 7:
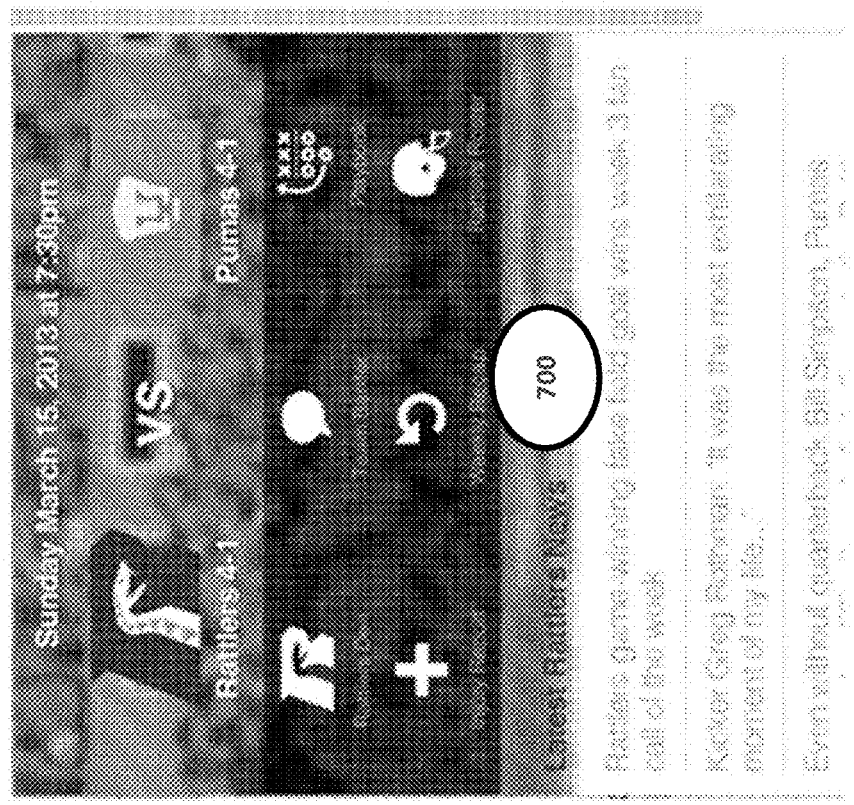
Figure 8:
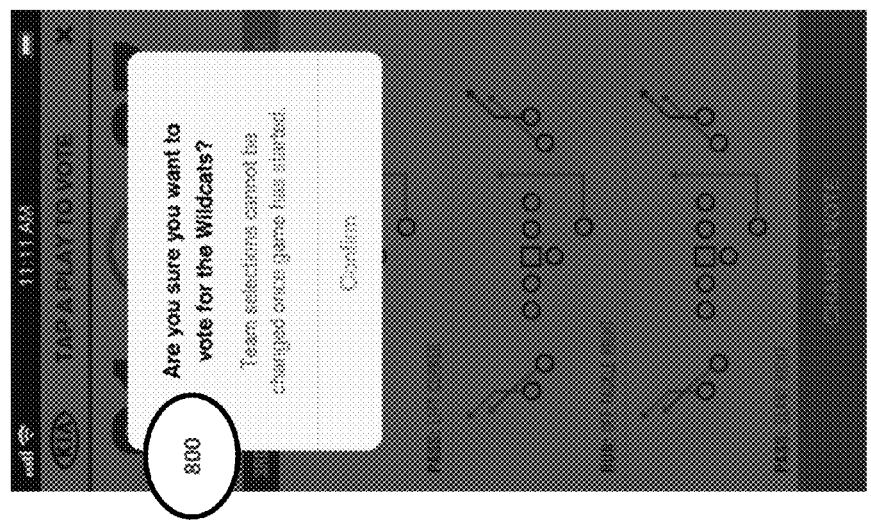
Figure 9:
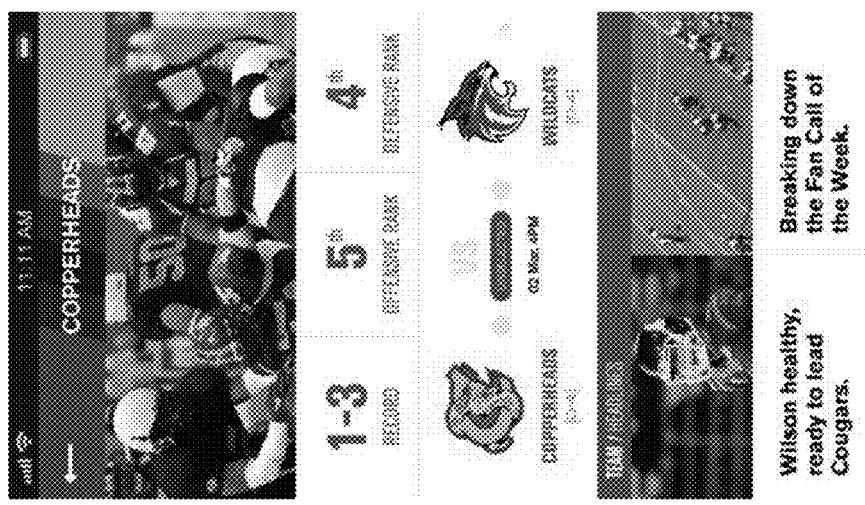
Figure 10:
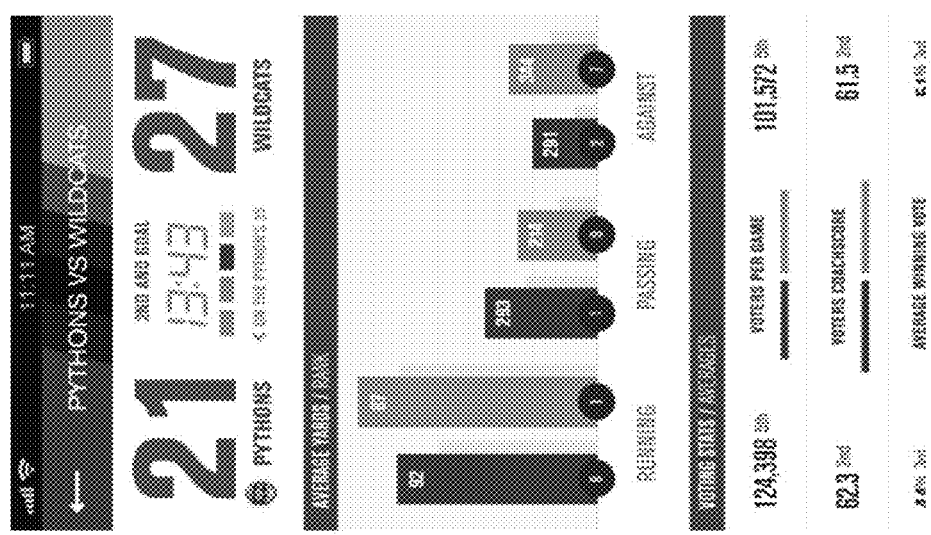
Figure 11:
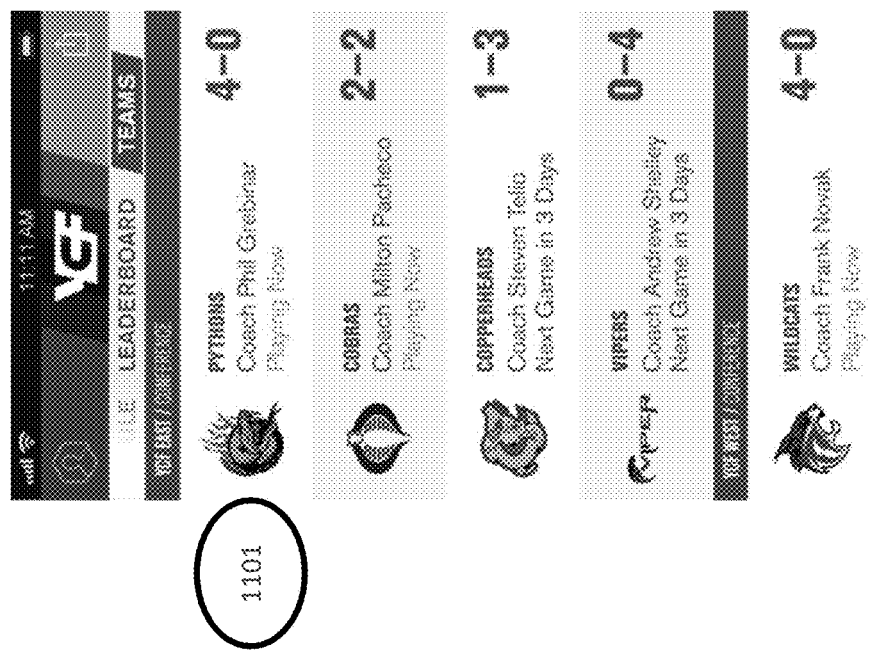
Figure 12:
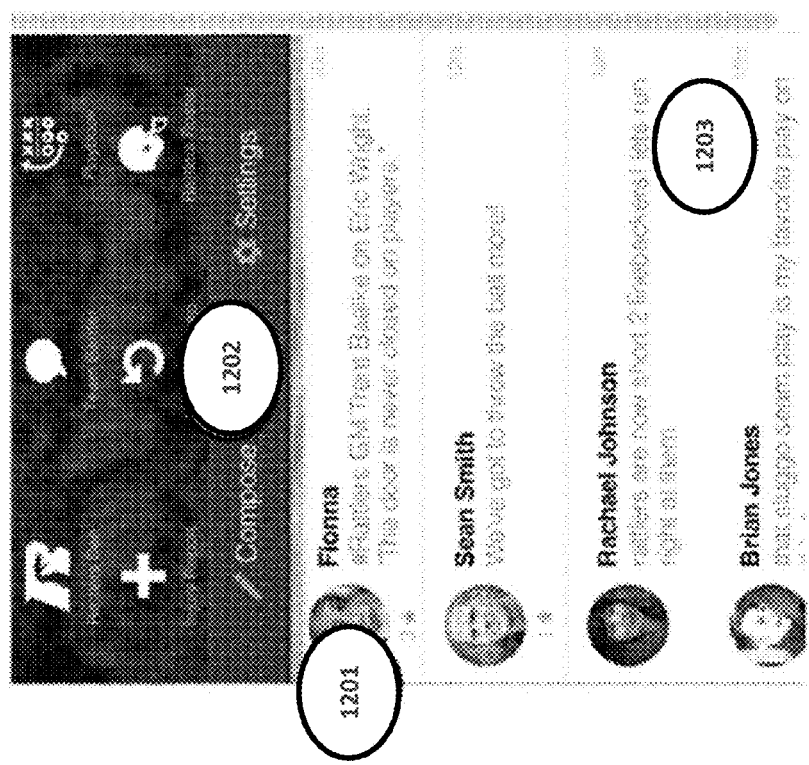
Figure 13:
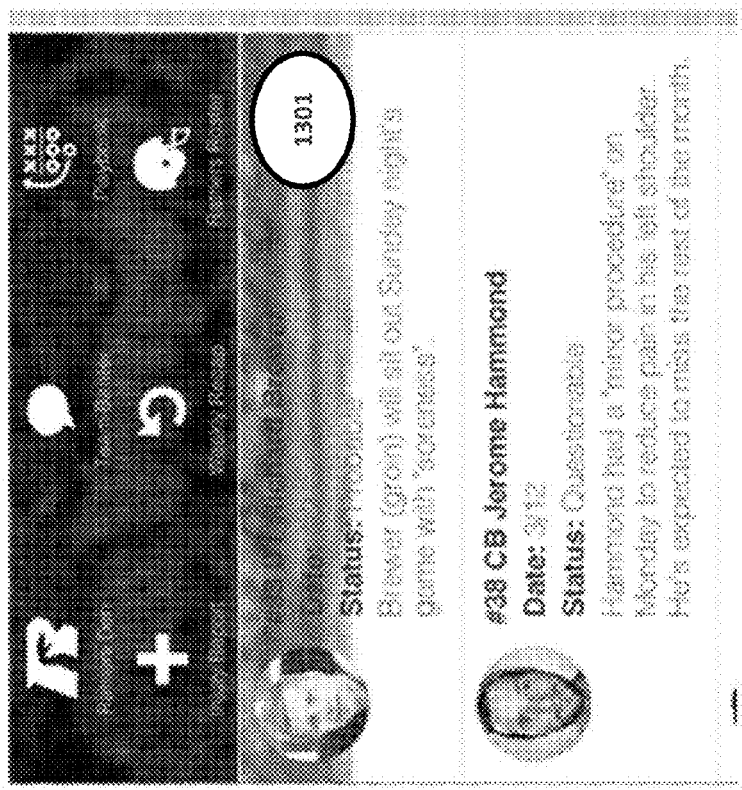
Figure 14:
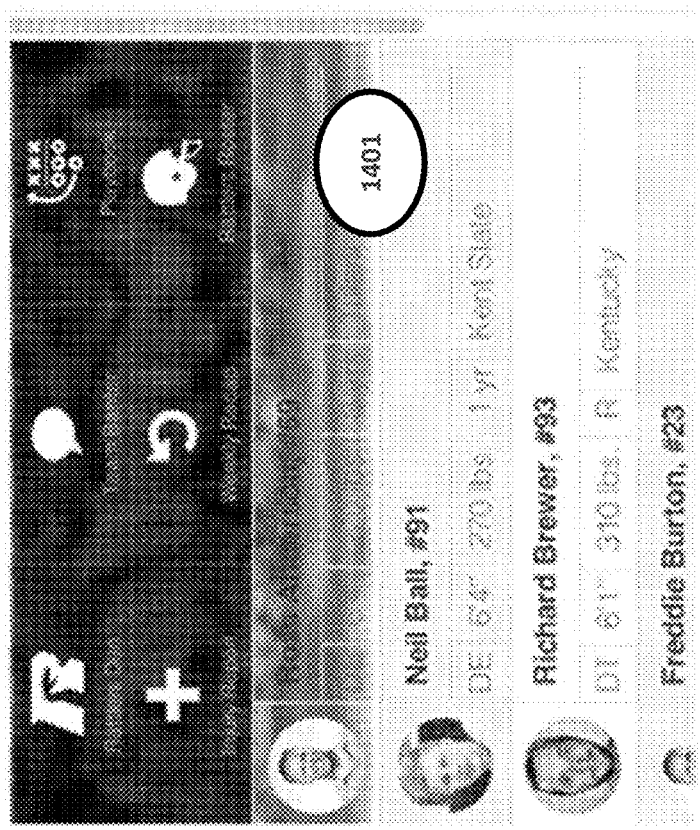

Fans can access team information 700, including coach and player videos and talk sessions as illustrated in the exemplary screenshot of FIG. 7. Also known as rattlers den, a repository of player videos and talk sessions can be branded for each team. Fans can be asked to choose and confirm a team selection 800, as illustrated in the exemplary screenshot of FIG. 8. In some embodiments, a fan has up until game time to change which team they vote for in any given game. Fans can also access a team page, as illustrated in the exemplary screenshot of FIG. 9. The team page can display various details about a team, including coach videos, player videos and talk sessions 900. Fans can also access a team match-up page, as illustrated in the exemplary screenshot of FIG. 10. To help fans determine which team to vote with, the team matchup page can include a comparison of game statistics for both teams, such as running and passing 1000. The team match-up page can also display voting statistics and averages. Fans can also access a team list, as illustrated in the exemplary screenshot of FIG. 11. In some embodiments, the team page lists all teams, their conference, rank, record, coach and next game 1101. Fans can access chat discussions 1202 and Twitter (or proprietary chat-based service) feeds 1203 as illustrated in the exemplary screenshot of FIG. 12. Also known as team banter, discussion and twitter feeds can be displayed alongside an icon of a fan displayed with their achievement level 1201. FIG. 13 is an exemplary screenshot illustrating fan access to injury reports 1301. FIG. 14 is an exemplary screenshot illustrating fan access to information 1401 on each player on the team roster.

Figure 15:
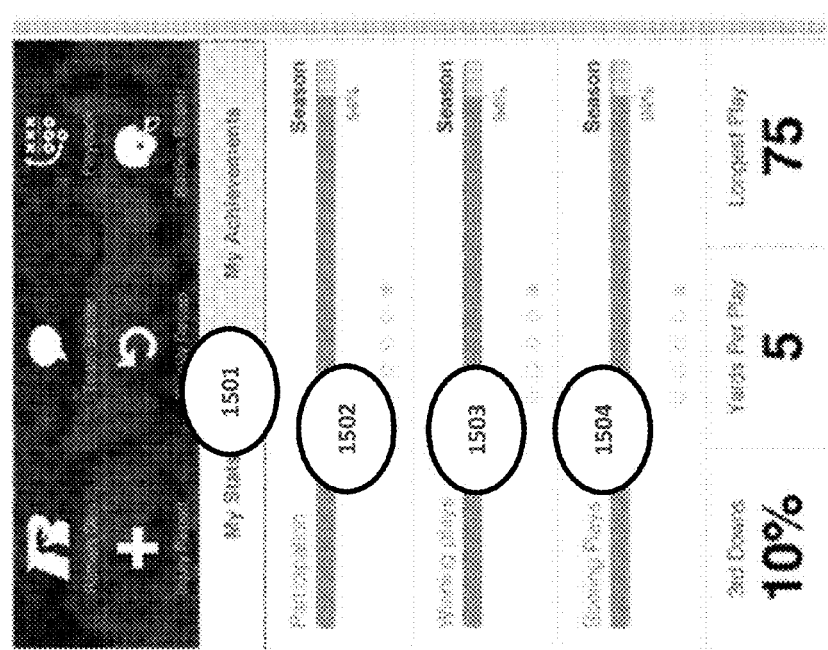
Figure 16:
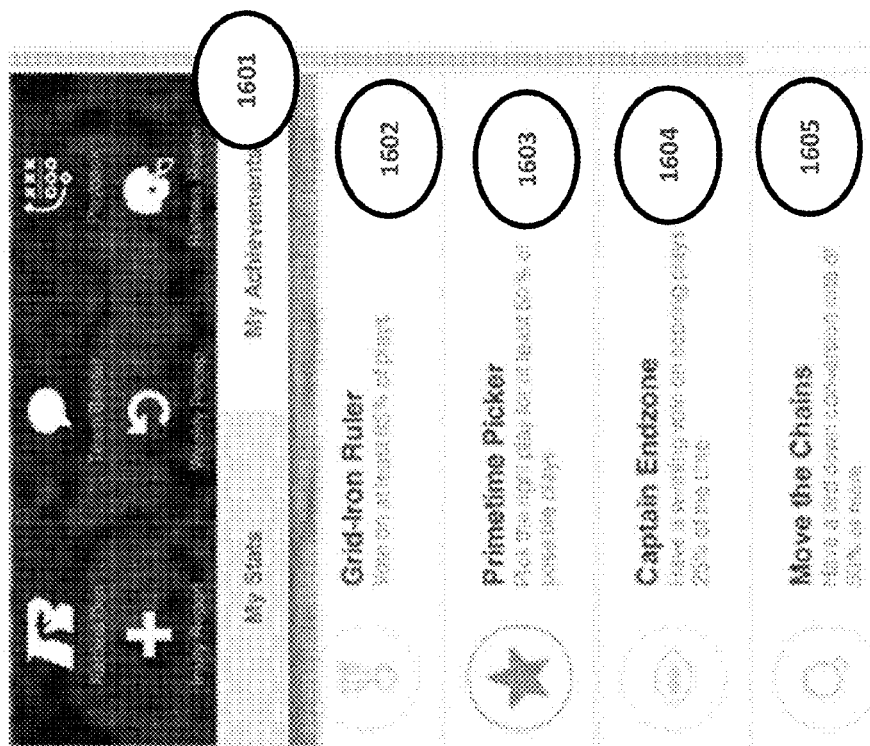

Along with this content, the system also offers fans functionalities to track their performance—My Stats 1501 shown in the exemplary screenshot of FIG. 15 and My Achievements 1601 shown in the exemplary screenshot of FIG. 16. My Stats 1501 details the Fan Coach Scores. The Coaching game logic engine of the live-game system scores the fan's Coaching or play calling performance. Participation 1502 indicates the % of plays that have been voted on by the fan. Winning plays 1503 indicates the % of times the fan's play choice was the winning play and run by the team. Scoring plays 1504 indicates the % of times a fan's play scored. My Achievements 1601 can indicate achievement levels earned by each fan. Achievements can include Grid-Iron Ruler 1602 (e.g., voting on a certain number of plays), Primetime Picker 1603 (e.g., picking a certain number of plays that have been executed), Captain Endzone 1604 (e.g., picking a certain number of plays that score), and Move the Chains 1605 (e.g., having a certain percentage of $3^{rd}$ down conversion).

Figure 17:
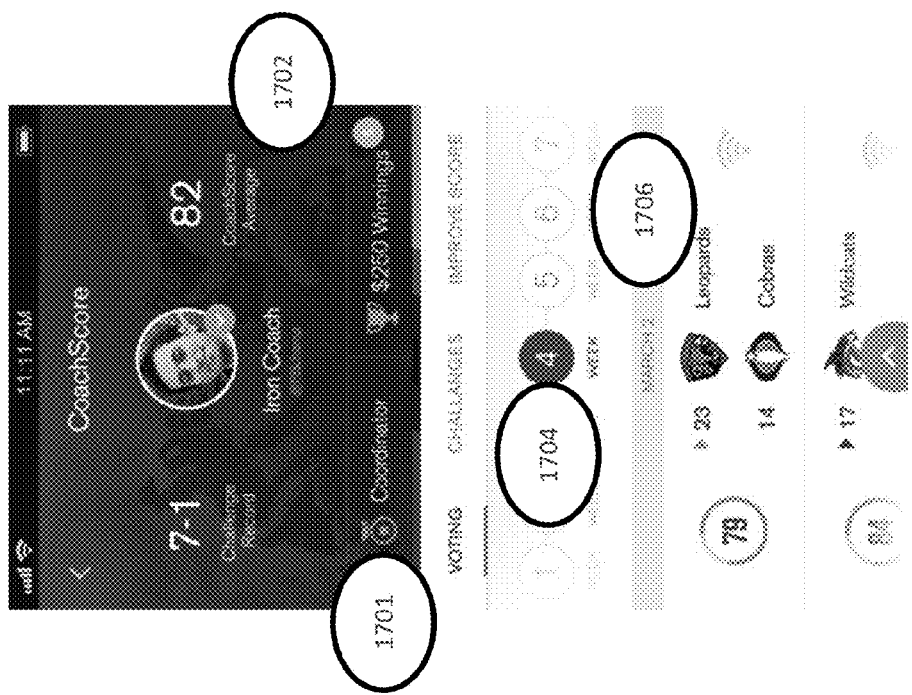
Figure 18:
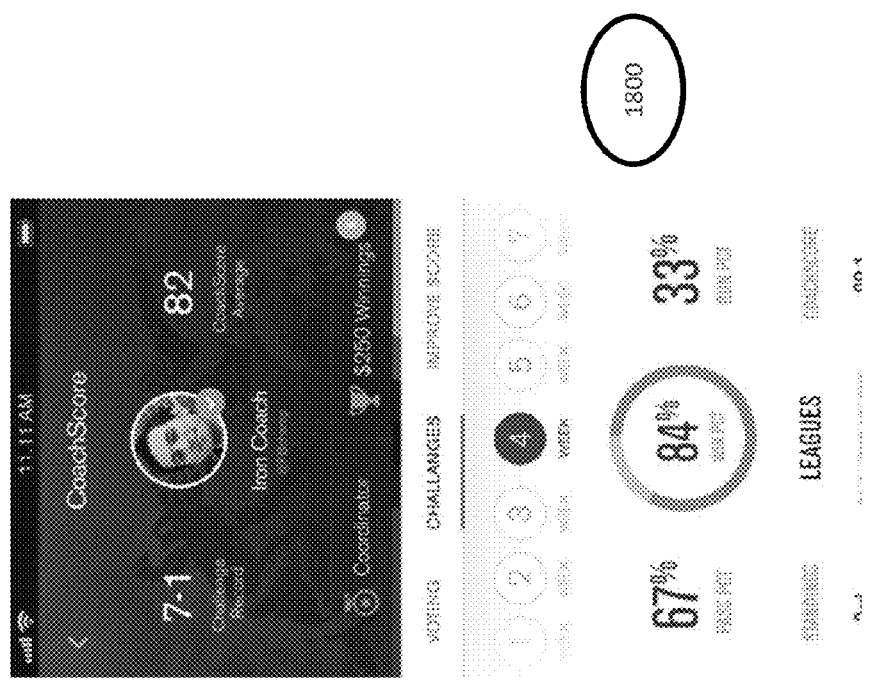
Figure 19:
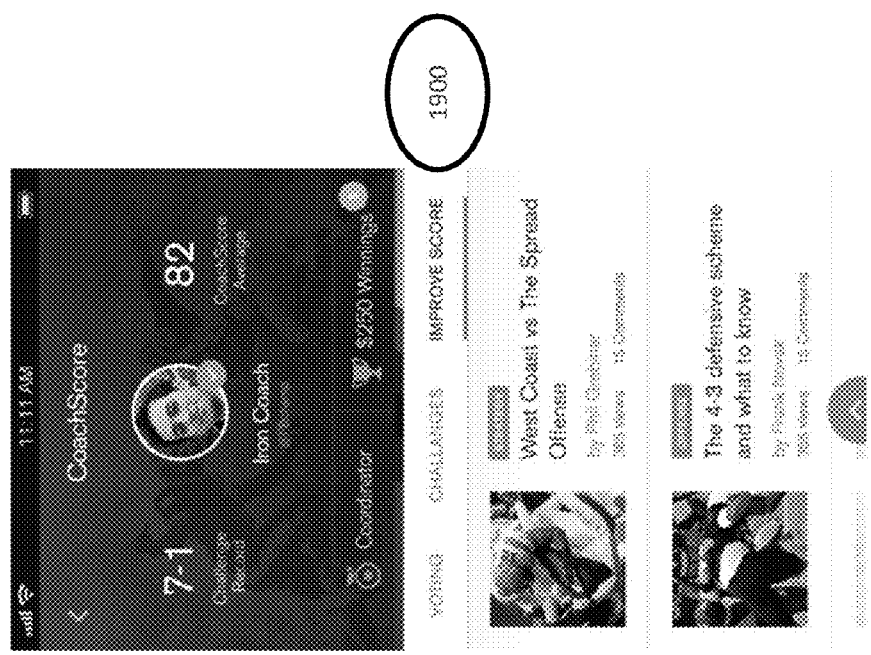

In some embodiments, Coach Score can be displayed on a user device, as shown in the exemplary screenshot of FIG. 17. The main page can include a fan Coach Score season average 1701, a voting section 1702, results for each week 1704, and results for each game 1705. In some embodiments, voting section 1702 includes a breakdown of how a fan earns a Coach Score. The breakdown can include details of Coaching game logic engine, described in more detail below. The Coach Score page can also include a challenges section, as shown in the exemplary screenshot of FIG. 18. Challenges can allow fans to see their performance within head to head challenges 1800, as described in more detail below. The Coach Score page can also include an education section, as shown in the exemplary screenshot of FIG. 19. The education section can include articles and activities to allow fans to learn more about play calling 1900. In some embodiments, articles and activities that are displayed in the education section are selected based on a fan's Coach Score.

Figure 20:
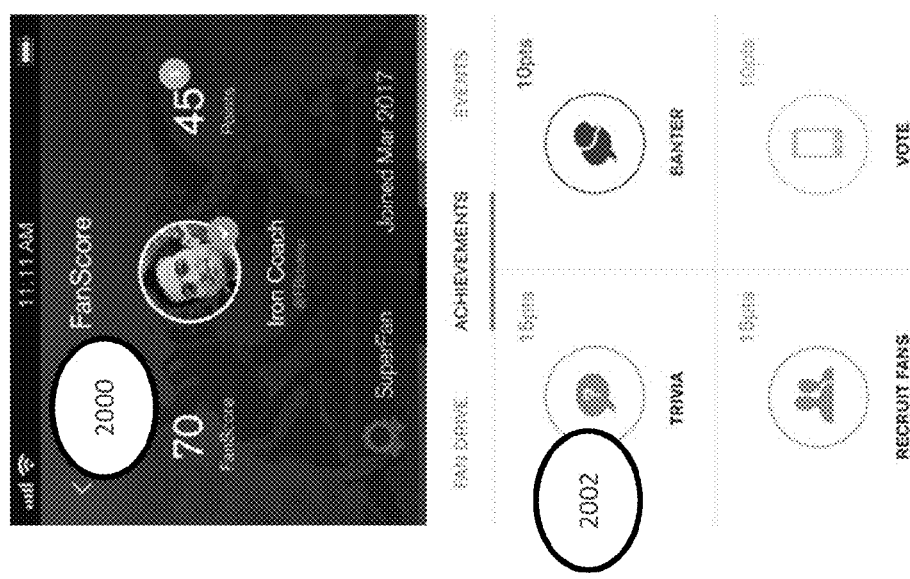

FIG. 20 shows screenshot of a Fan Score page, according to some embodiments of the present disclosure. A Fan Score page can show points fans earn by participating in events hosted by the system 2000. A Fan Score page can include an Achievements Section, showing fans how they have earned points 2002.

Figure 21:
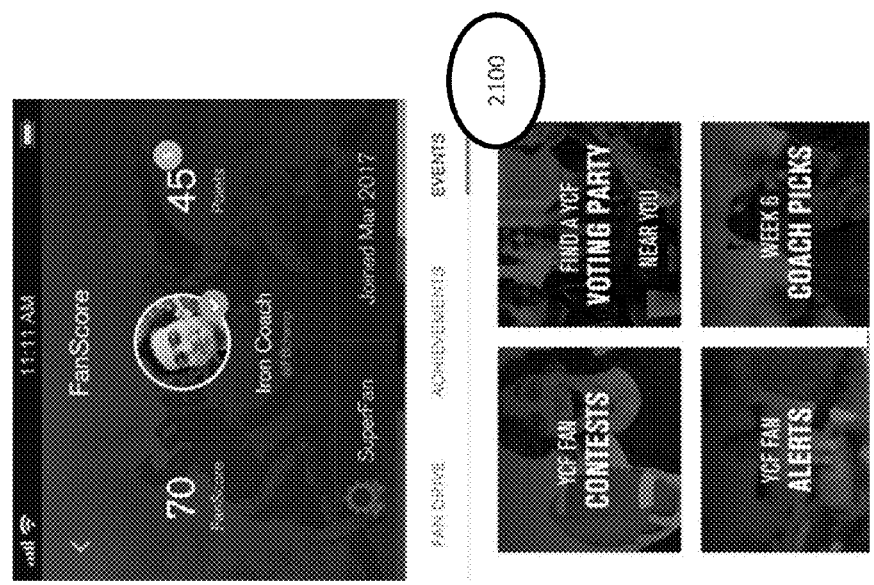
Figure 22:
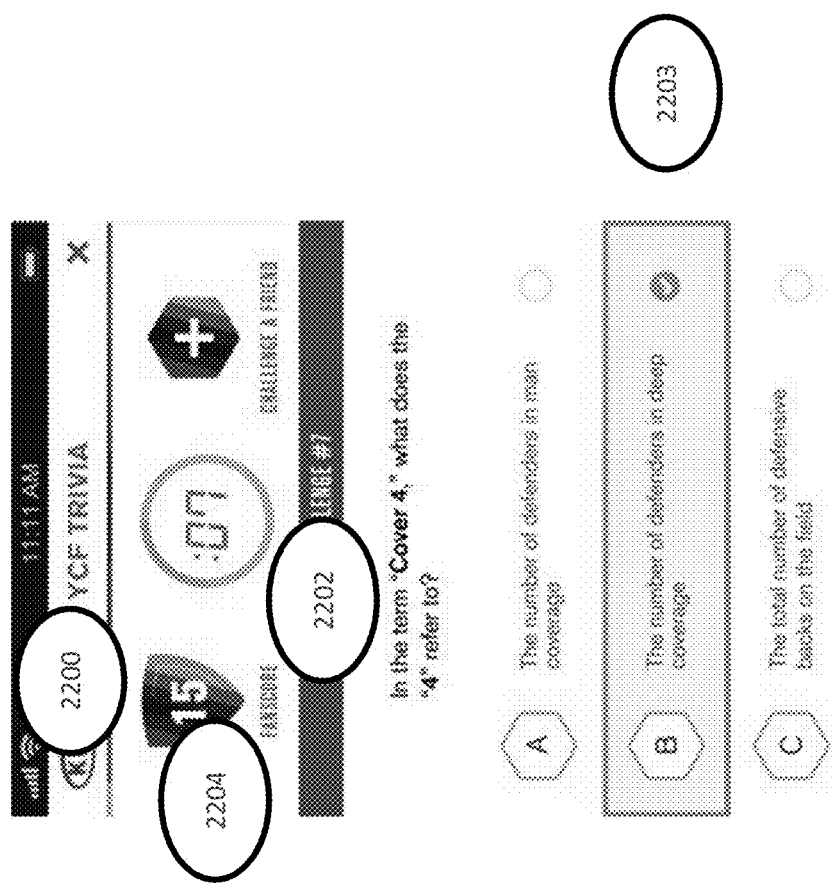
Figure 23:
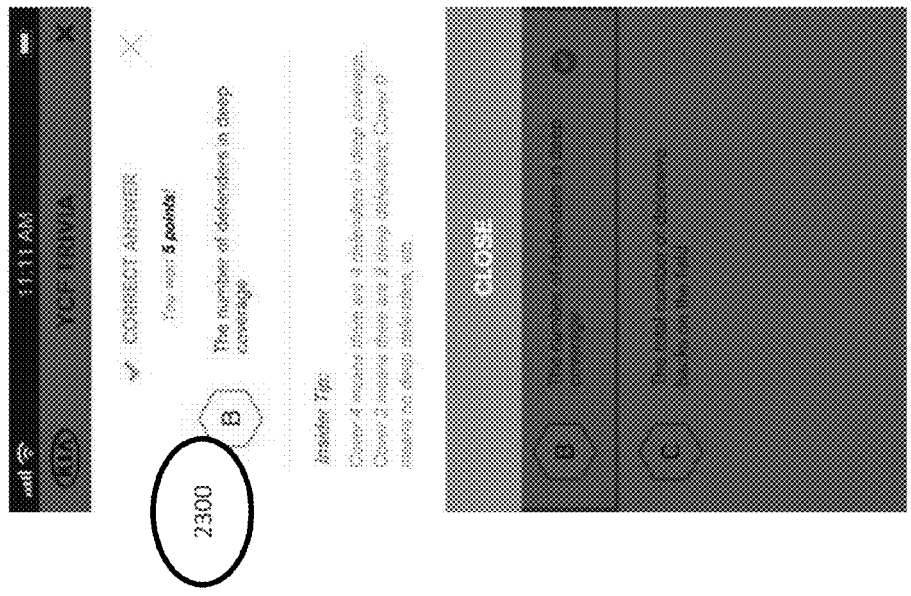
Figure 24:

A FanScore page can also include an Events section, as shown in the exemplary screenshot of FIG. 21. An Events section can include links to activities where fans can earn additional points 2100. Activities can include fan contests, finding a fan voting party, subscribing to fan alerts, and tuning into coach picks. Activities can also include answering trivia or other questions, as shown in the exemplary screenshot of FIG. 22. Trivia allows fans to participate in real-time trivia and related contests 2200. In some embodiments, each question has a time limit 2202, and a fan can choose one of three answers 2203. A fan can gather points that contribute to FanScore points 2204. A fan is delivered a Trivia Answer page after answering a trivia question, as shown in the exemplary screenshot of FIG. 23. A fan can be shown a correct answer, their answer, and an explanation of the correct answer 2300. FIG. 24 shows a screenshot of a rewards page, in accordance with certain embodiments. Fan Points can be accumulated and redeemed for real merchandise and digital goods 2400.

Figure 25:
Figure 26:
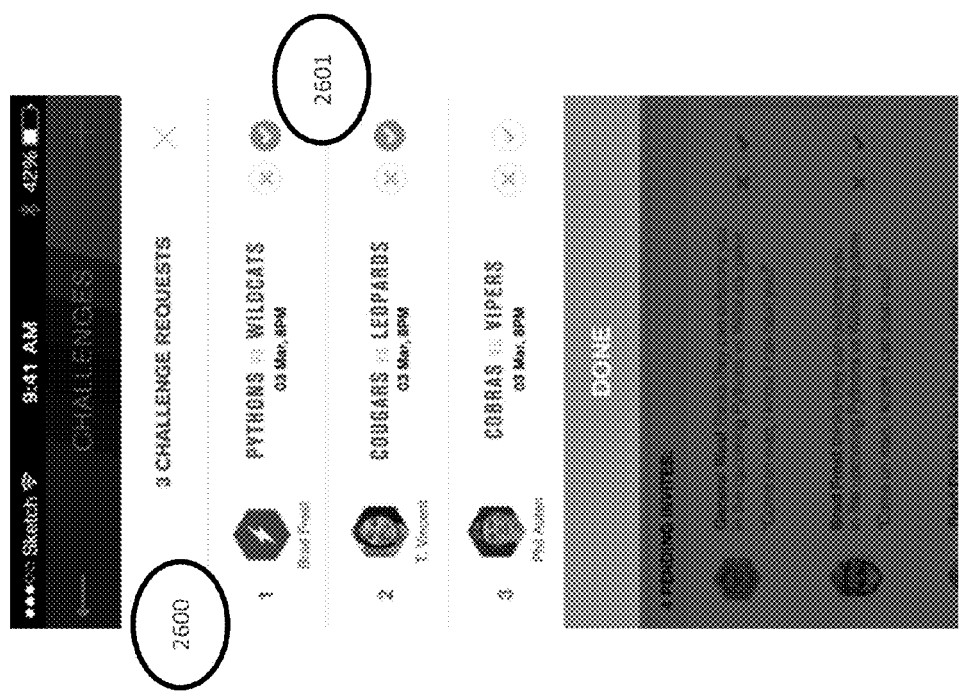

Fans may participate in Challenges, as shown in the exemplary screenshot of FIG. 25. Fans can initiate challenges 2501 and define a type of challenge 2502. Challenges may be decided by CoachScore, a measure of effective play-calling. Challenges may also be decided by FanScore earned by answering trivia or other questions 2200. Challenges can involve individual players or player-defined leagues. The duration of a challenge can last any amount of time (e.g., single game, weekend, or season). A Challenges Page, as shown in the exemplary screenshot of FIG. 26, can also include real time requests for challenges 2600. Fans can choose either to accept or reject a real time challenge 2601.

Figure 27:
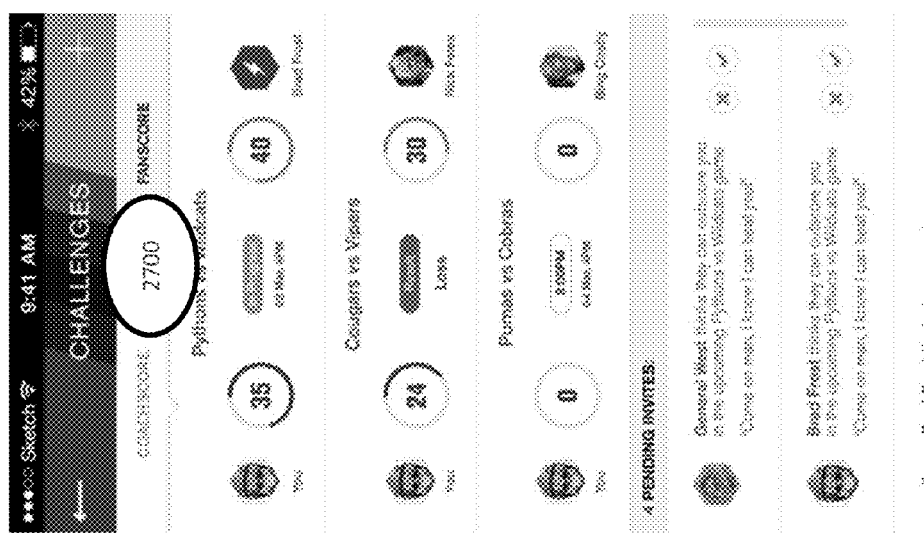
Figure 28:
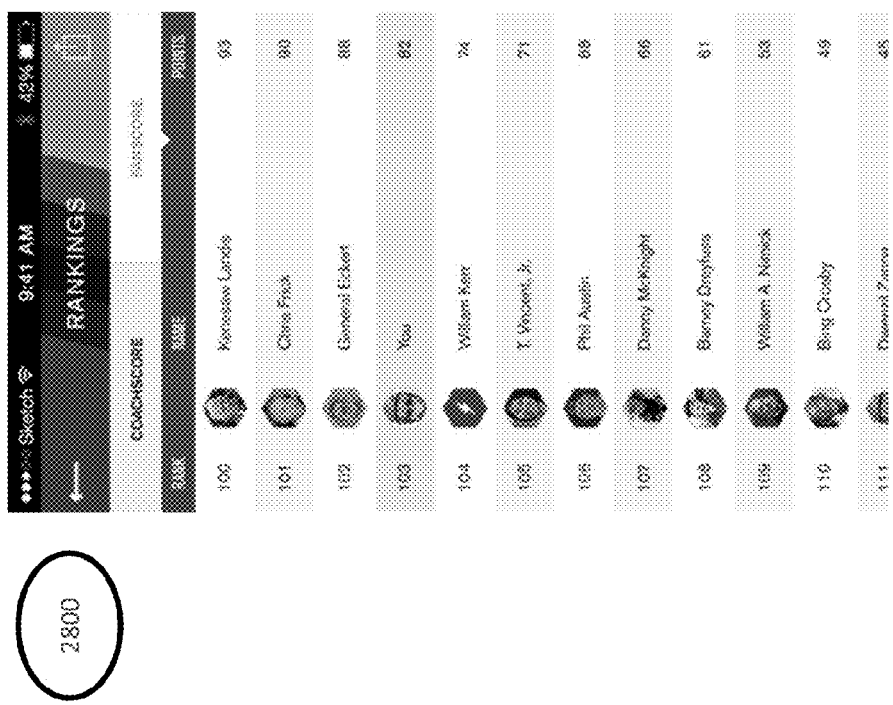

Fans can also access real-time results on the system, as shown in the exemplary screenshot of FIG. 27. Real time results include allowing fans to see in real-time how they are performing in their CoachScore and FanScore challenges as well as any pending invites 2700. Real time results can also include rankings, as shown in the exemplary screenshot of FIG. 28. Fans can see in real-time where they are ranked for both CoachScore and FanScore 2800.

Figure 29:
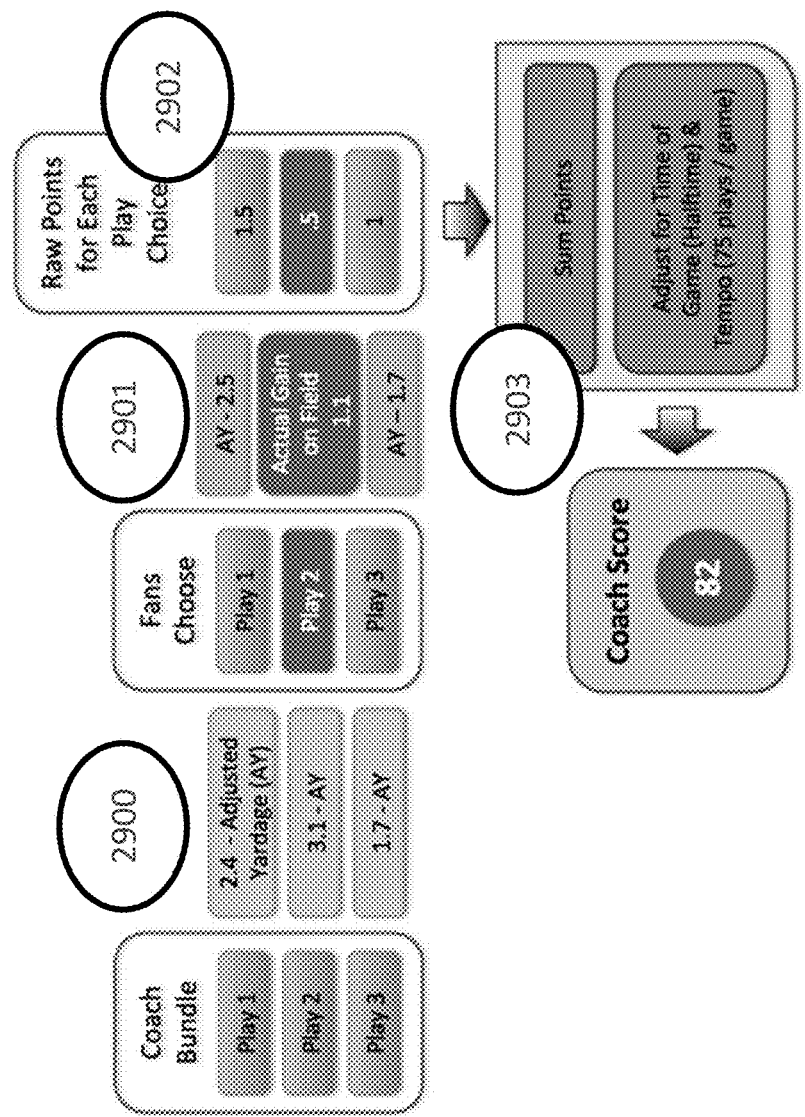

FIG. 29 is a screenshot illustrating a coach score engine, according to some embodiments of the present disclosure. Coaching game logic engine (also referred to in the present disclosure as "CoachScore Engine") can determine each player's CoachScore. In some embodiments, coach score ranges from 50-100. Unlike traditional "fantasy" points, Coach Score is not merely additive. Each player's Coach Score can be calculated after each drive and can naturally vary through the course of each game. CoachScore Engine first receives a coach bundle, which can include 3 plays. CoachScore Engine assigns a historical "Adjusted Yardage" 2900 based on data from prior games. The historical Adjusted Yardage 2900 can be calculated automatically from the data from prior games, as described in more detail below. The play run on the field is then scored on the yards gained on the field, augmented by positive modifiers for good results (e.g., earning a first down or scoring) or negative modifiers (e.g., resulting in a sack of the quarterback or lost yards) 2901. The three plays' Adjusted Yardage scores (two historical, one actual) are then ranked, highest to lowest, $1^{st}$, $2^{nd}$ and $3^{rd}$. Each play is then assigned points 2902 based on its ranking. The points are continuously summed and adjusted for tempo 2903. Tempo adjustments 2903 allow scoring to be consistent, whether the game is partially complete or complete and whether a team runs a fewer number or a greater number of plays (e.g., 65 plays or 85).

Figure 30:
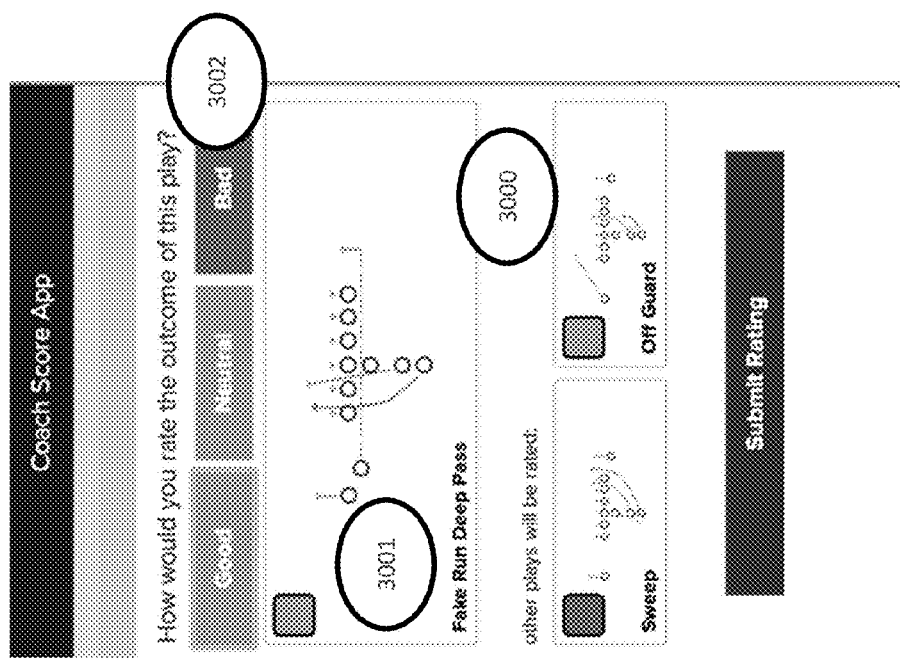

FIG. 30 is a screenshot illustrating a coach score engine moderator, according to some embodiments of the present disclosure. The moderator application can rate the play actually run on the field versus the historical expectations of the other two non-winning plays. The coach score moderator application can rank (e.g., good, neutral, bad or $1^{st}$, $2^{nd}$, $3^{rd}$) the play result seen on the field relative to the historical expectations of the two plays not selected, and submit any additional factors, especially errors (dropped pass, fumble, etc.), that impact the assessment of the play 3002. The application can display which plays are suggested by a coach and which play was run on a field 3000 3001. The ranking can come from a human operator or can be determined by a computing device.

Figure 31:
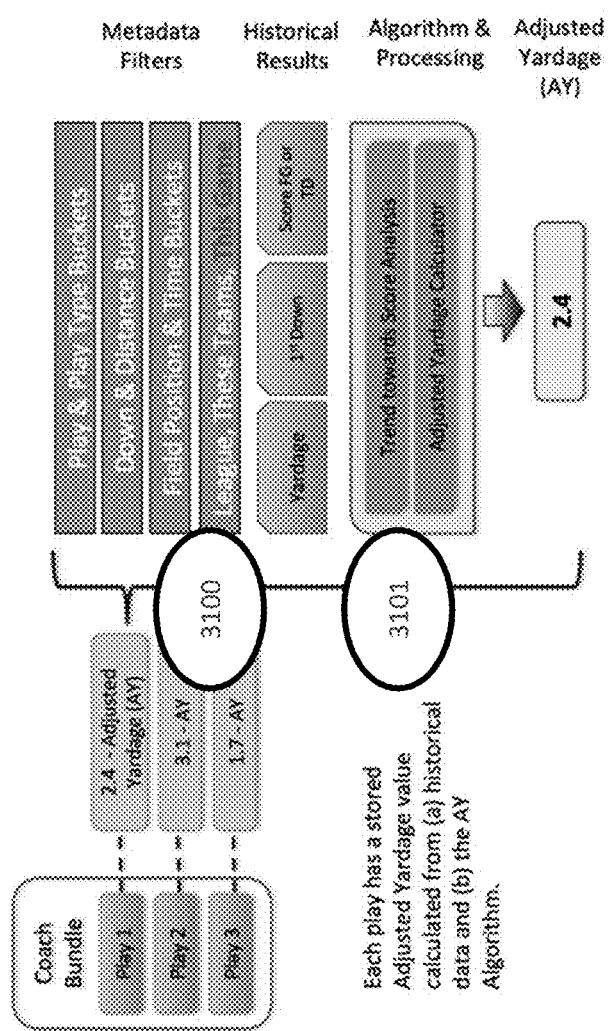

FIG. 31 is a screenshot illustrating the calculation of historical Adjusted Yardage within a coach score engine, according to some embodiments of the present disclosure. Each play can have a stored adjusted yardage value calculated from historical data and the adjusted yardage algorithm. In both pre-time and real-time, the system can calculate historical Adjusted Yardage from historical results 3100. This calculation starts by identifying all plays previously run, noting their results (e.g. yardage gained, $1^{st}$ downs gained, scoring, game, play #, etc.), annotating each play with additional scenario identifiers (e.g., team, defense faced, game #, field position, time, down, distance, play type, in-game play #, etc.), grouping these play-scenario combinations, calculating typical yardage gained for each play-scenario combination 3100, and, finally, enhancing typical yardage with $1^{st}$-down and scoring trending 3101 to produce a historical Adjusted Yardage number for each play in each scenario. The adjusted yardage calculation weighs results from the current game, current teams, and more recent games more heavily than results from less current and less pertinent teams.

Figure 32:
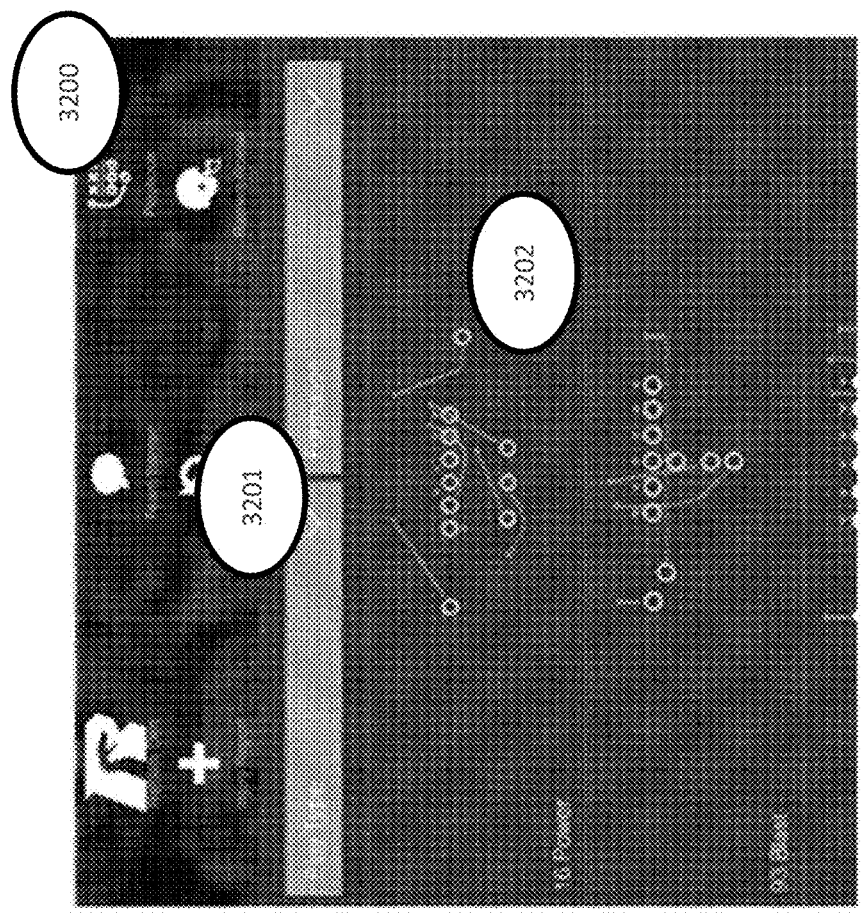
Figure 33:
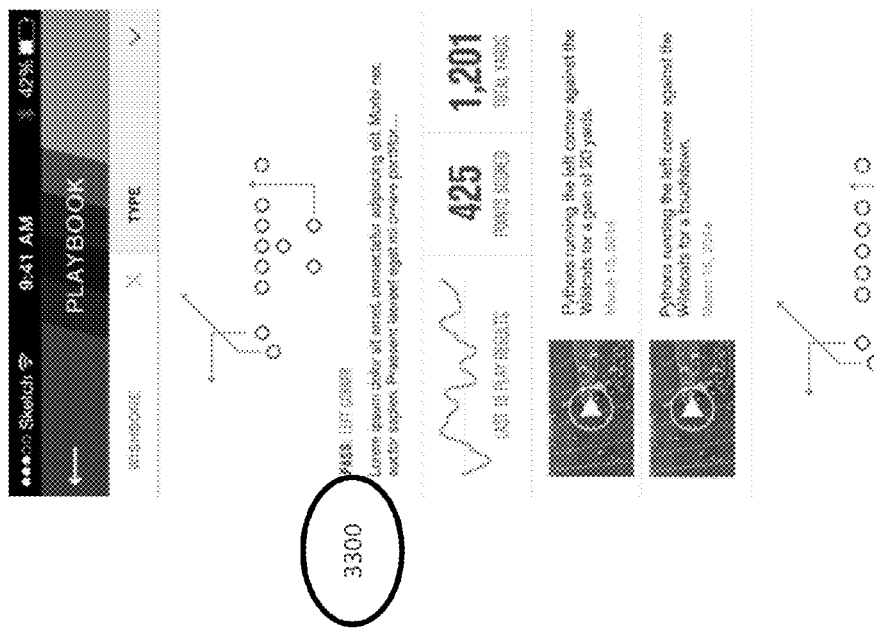

The Playbook section of the Fan App is indicated by way of example in the screenshot of FIG. 32. The playbook details the plays for the fan's team 3200. The fan can sort by Play Type Formation 3201. Each play includes a Detailed diagram, Simple Name, Coach Name, etc. 3202. The Playbook section can also include Playbook Detail, as shown in the exemplary screenshot of FIG. 33. Every play in a team's playbook can be clicked on to offer more detail, past performance, and video to illustrate the play and its performance history 3300.

Figure 34:
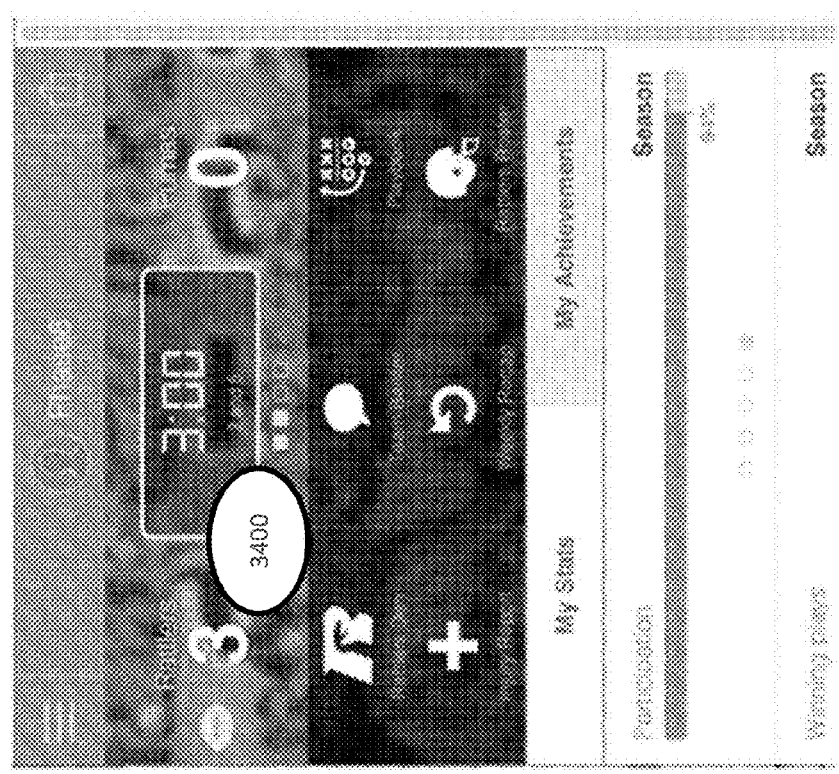
Figure 35:
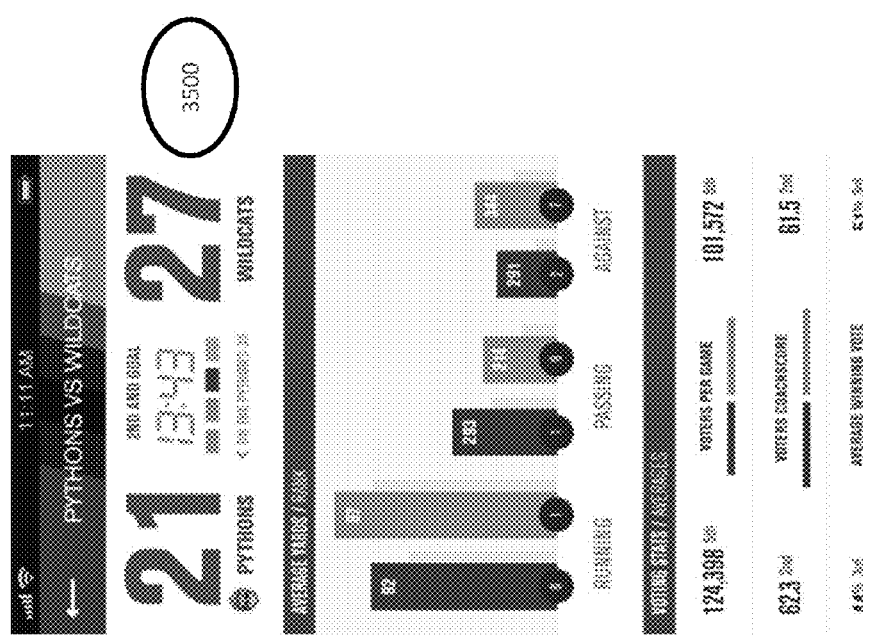

The content items discussed above are live and active content during an actual game. When a game starts, the Fan App automatically changes to a gamecasting/push app determined by a League Official as shown in the exemplary screenshots of FIGS. 34 and 35. During the game, the Fan App automatically displays game information 3400 3500 such as the teams playing, which quarter, the time/game clock, the score, which team has possession, and down and distance.

Figure 36:
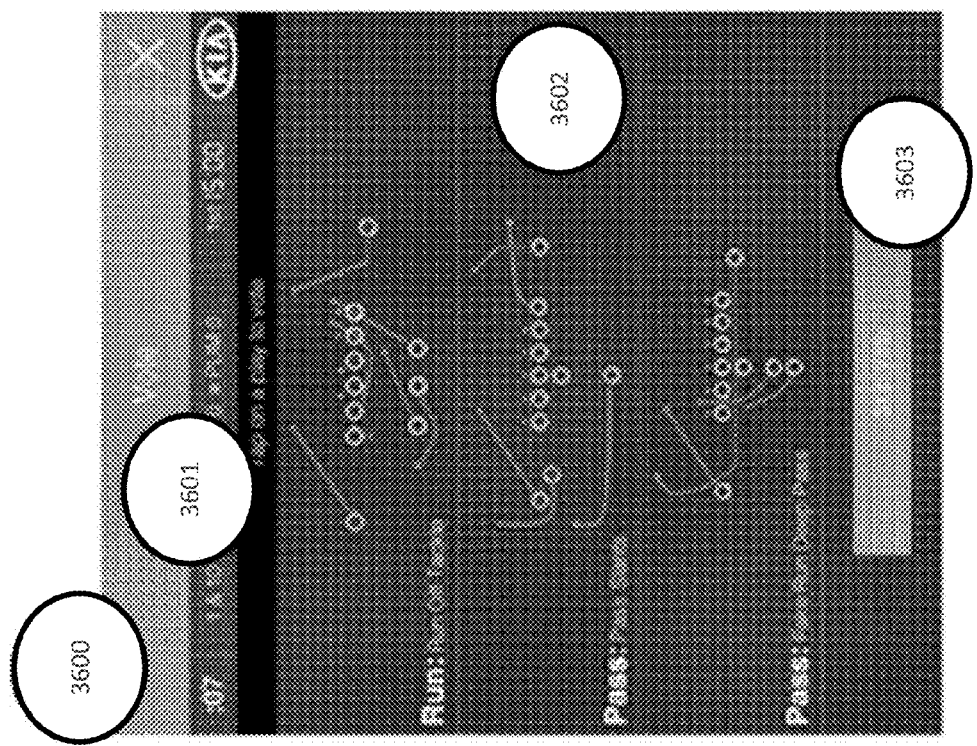
Figure 37:
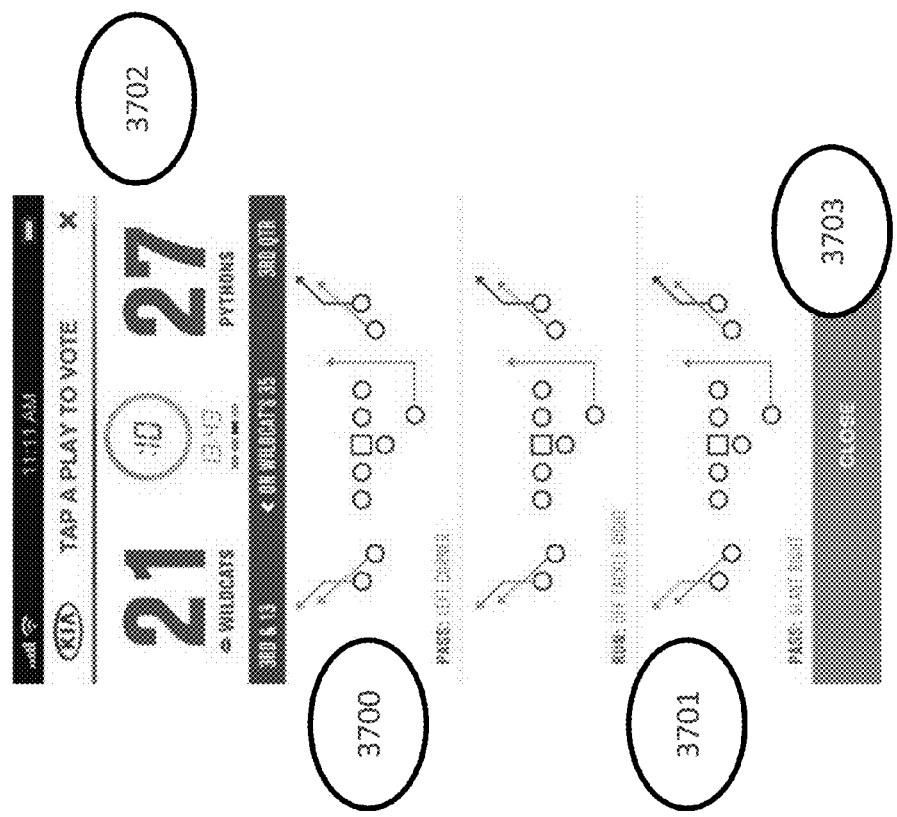

Once a game is in progress and a fan is logged in correctly, the system automatically pushes a vote to the app as shown in the exemplary screenshots of FIGS. 36 and 37. Fans can see a push of the vote of coaches play choices visually through the voting screen, manually through a buzz, and/or aurally through a tone 3600 3700. The screen displays down, distance, field position, and game time in real time 3601. The screen can also display play choices as graphical renditions of the plays as well as text 3701. Visually through graphical renditions of plays, fans can see the three coach choices 3602. Fans can also choose to Skip Vote 3603 by clicking an "x" button 3702 or clicking a "close" button 3703, if desired.

Figure 38:
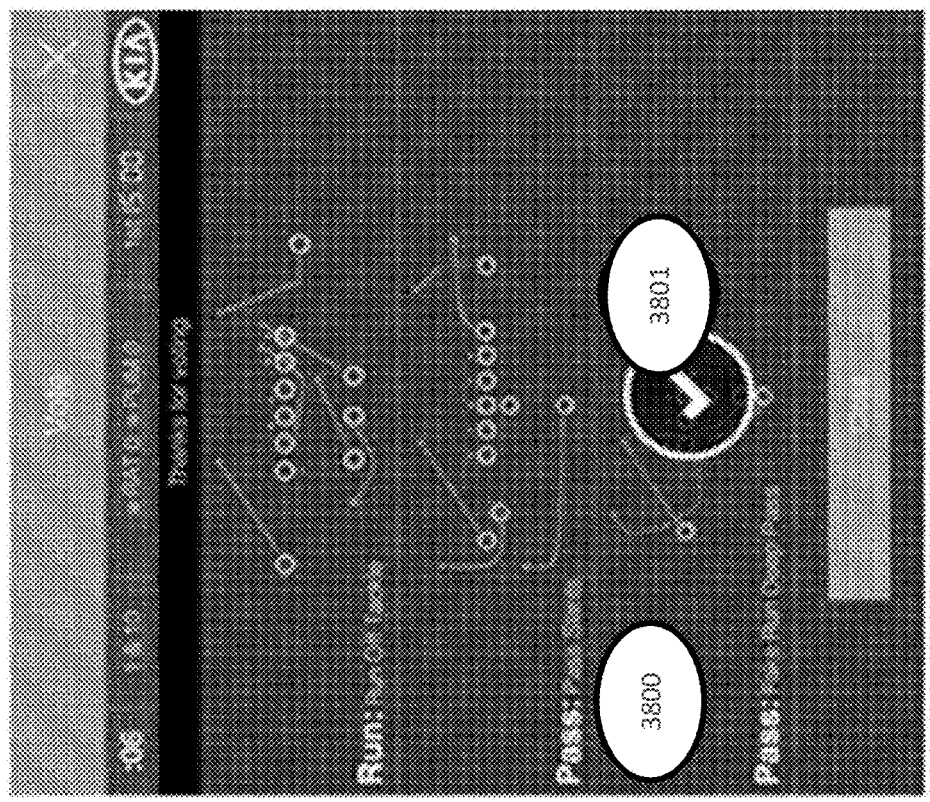
Figure 39:
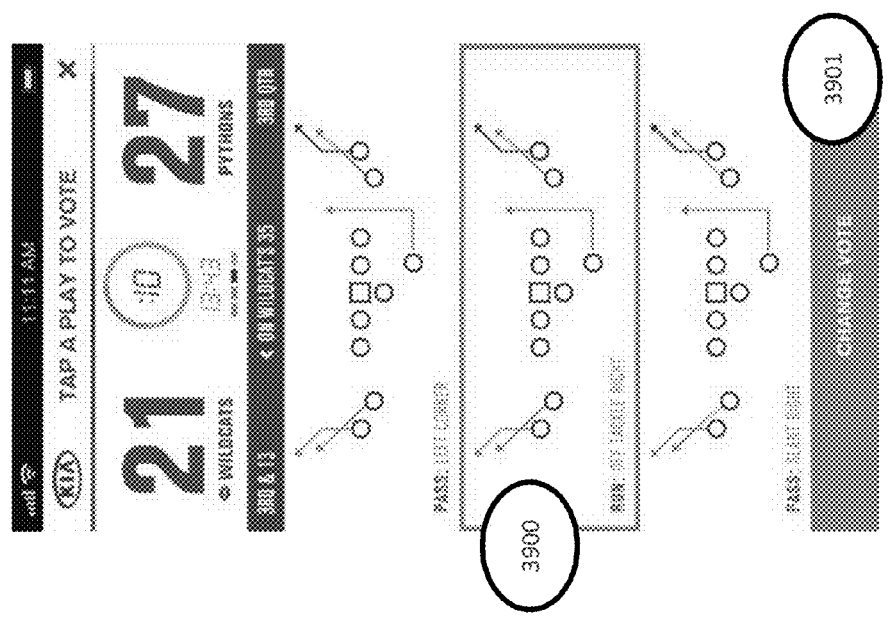
Figure 40:
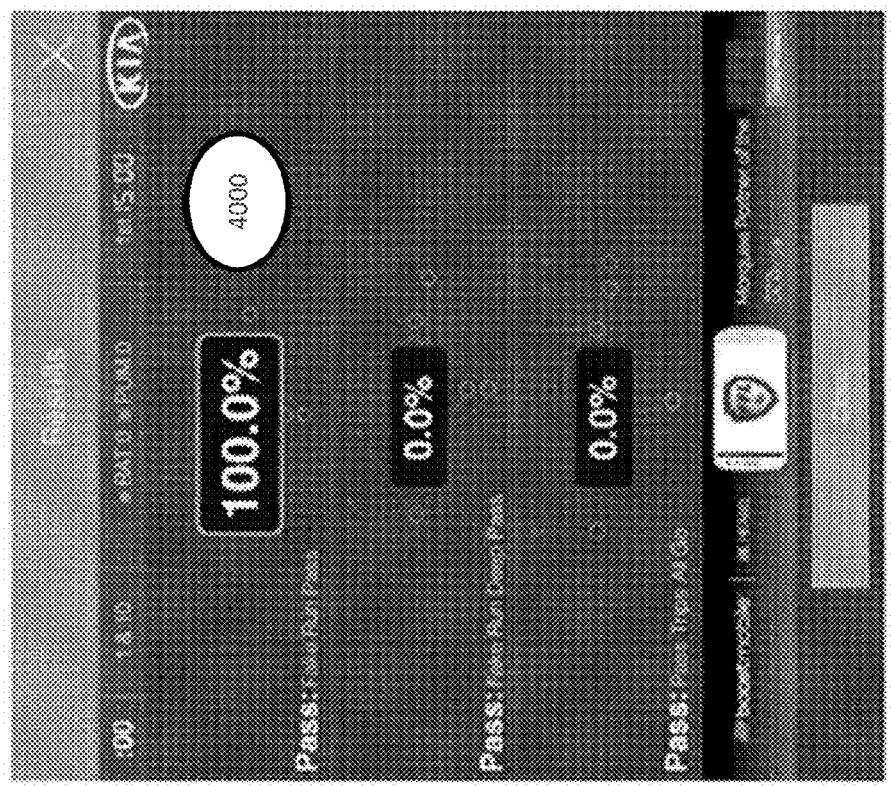
Figure 41:
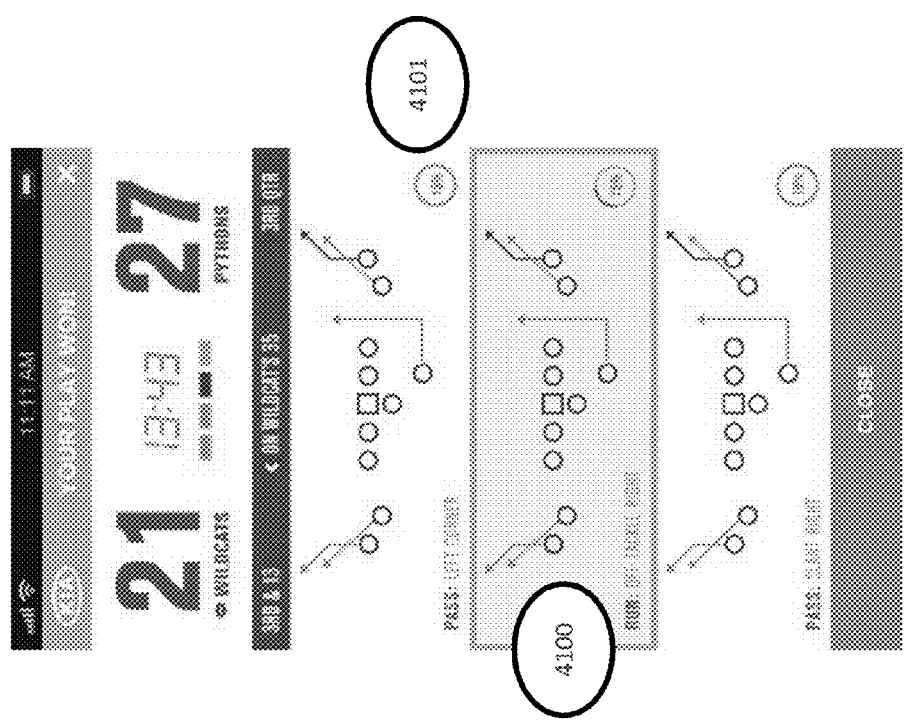
Figure 42:
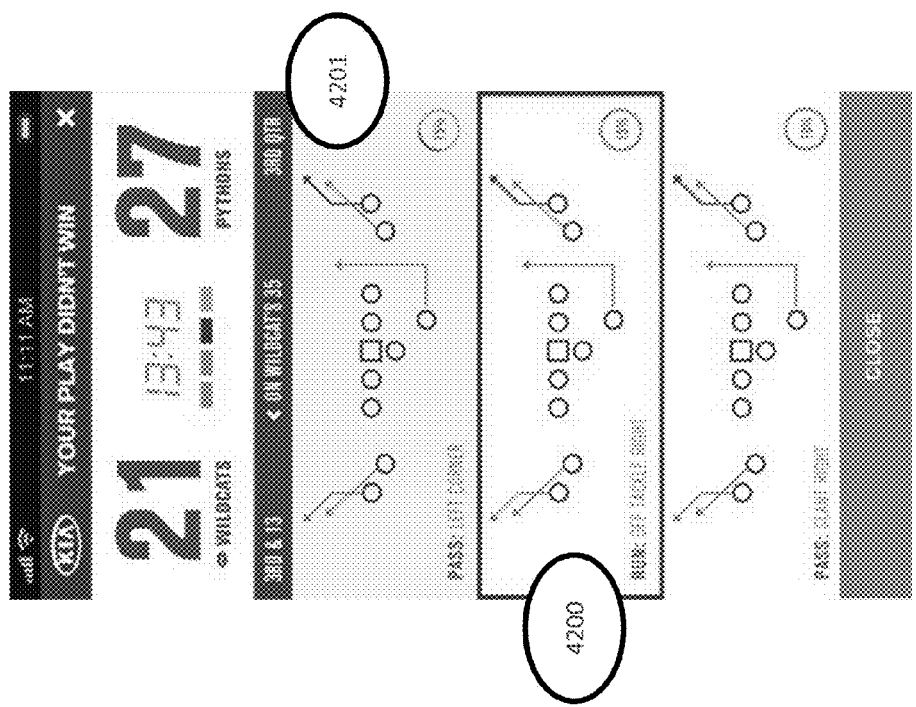

Once fans receive a poll from the system as illustrated in the exemplary screenshots of FIGS. 38 and 39, they can vote with a single touch of the play of their choice 3800 3900. In one embodiment, their chosen play is marked 3801 and automatically sent to be tabulated to the back-end service of the system. In another embodiment, fans can choose to change their vote by clicking a "change vote" button 3901. Fans then watch the winning play executed on the field. As shown in the exemplary screenshots of FIGS. 40 and 41, the Fan App shows fans when their play has been selected to be run on the field 4100 and what % of fans voted for each play 4000 4101. As shown in the exemplary screenshot of FIG. 42, the Fan App can also show fans when their play has not been selected to be run on the field 4200. When a fan's play is not selected, they are also shown the winning play 4201.

Figure 43:
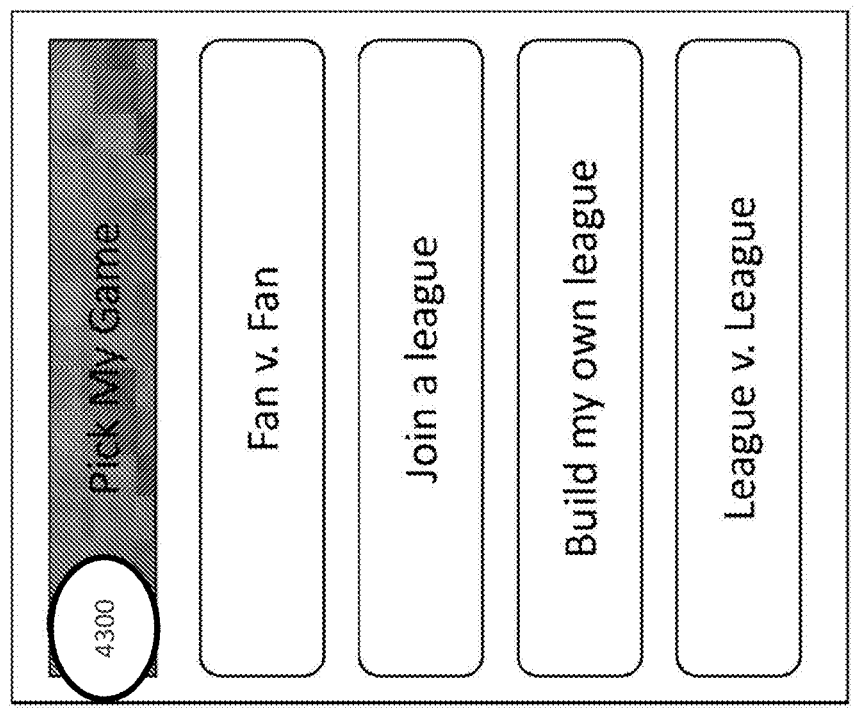
Figure 44:
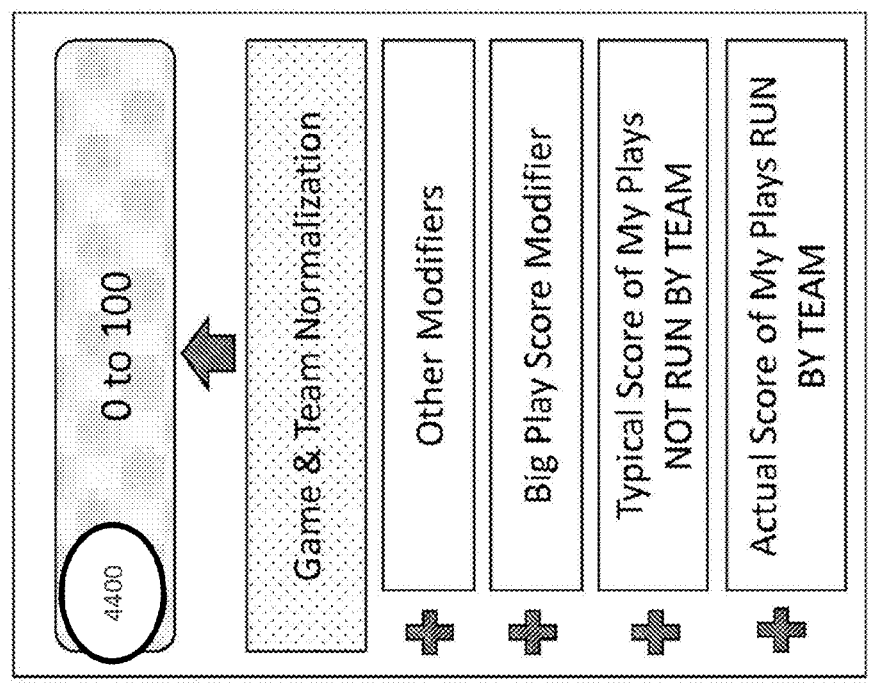

In addition to the live football game, fans can compete against other fans and other groups of fans on their coaching expertise. Fans can choose and structure the ways in which they want to compete 4300 as shown in the exemplary screenshot of FIG. 43. Game dimensions can include, e.g., Single game vs. season, Player vs. player, Intra and Extra-team leagues, Player-defined leagues, and League vs. league. Fans can compete using their Coaching Score in additional to their Achievements as shown in the exemplary screenshot of FIG. 44. A coach score is derived from the actual and typical results of the plays voted on by fans 4400. Scores are normalized to adjust for differences in team styles and results.

Coaches/Coordinators

Figure 45:
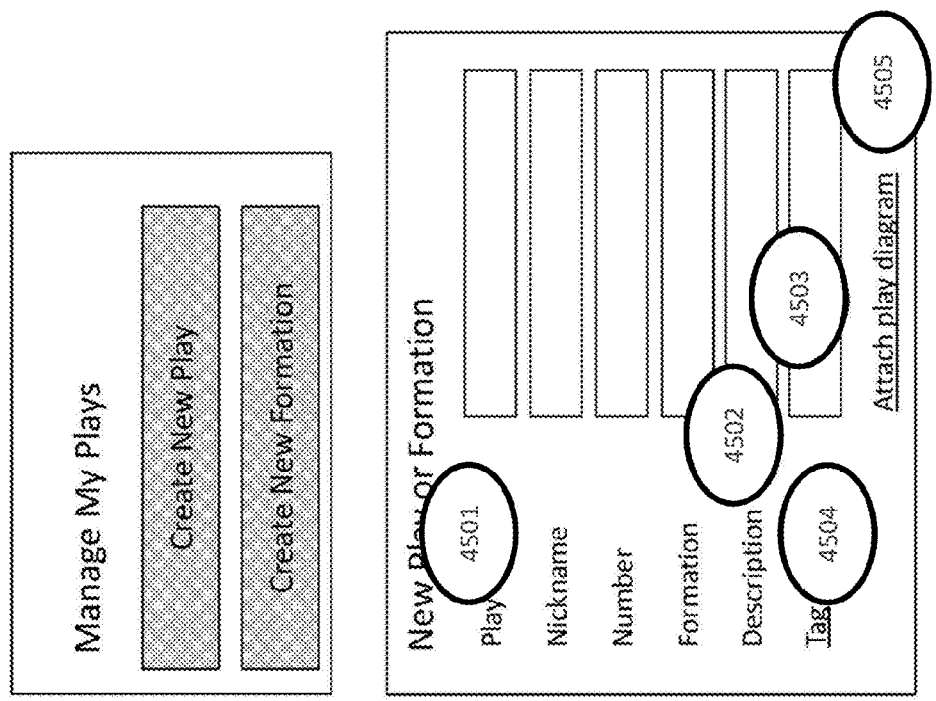

The system allows coaches/coordinators to enter plays or formations to facilitate player coaching, game planning, and play selection. As shown in the exemplary screenshot of FIG. 45, coaches/coordinators can enter multiple name types 4501 and a description 4502 for new plays and formations. Coaches/coordinators can apply standard tags to each play 4503 including, e.g., "opening script", "short yardage", "medium yardage", "long yardage", "pass", "run", "game 1", "game 2". Coaches/coordinators can define new tags 4504 and can attach images to each play 4505.

Figure 46:
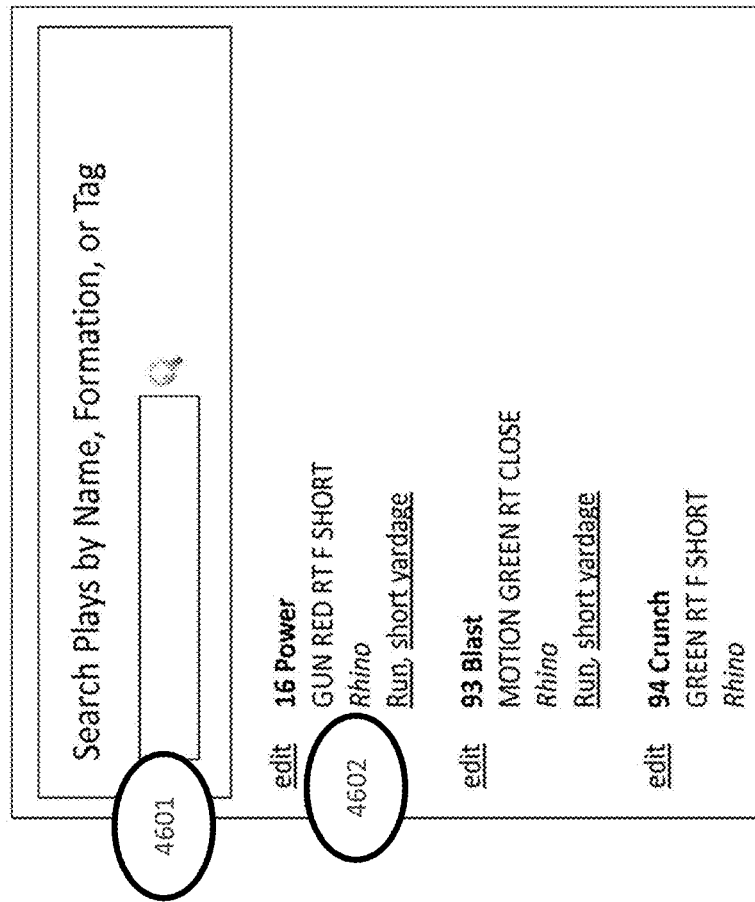

As shown in the exemplary screenshot of FIG. 46, coaches/coordinators can manage playbooks. They can search for plays by multiple categories 4601 and edit play names, tags, formations, etc. 4602.

Figure 47:
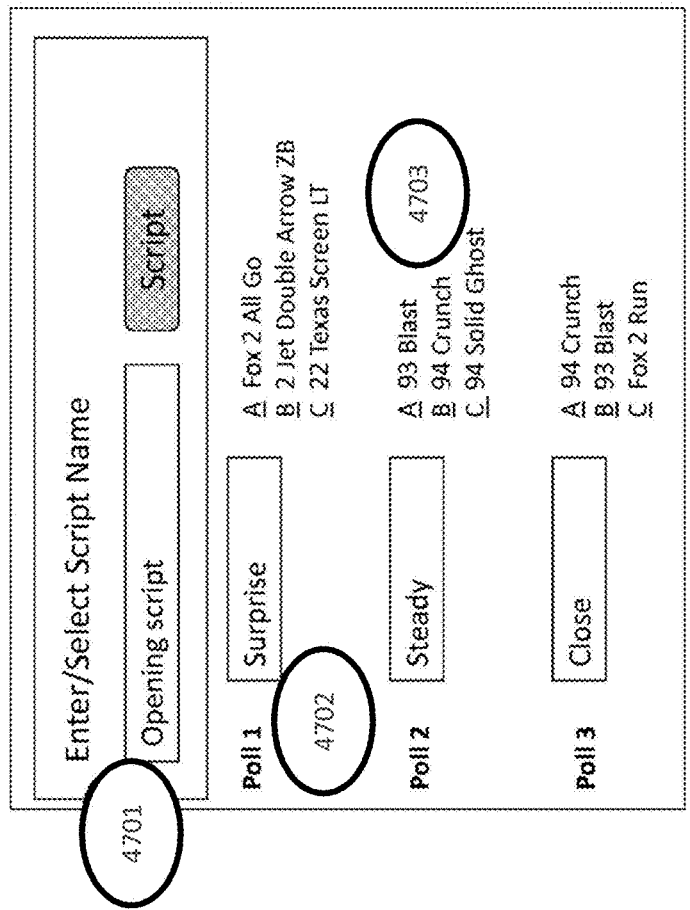

Coaches/coordinators can build scripts of plays that can be used for game planning, coaching, and easy selection as shown in the exemplary screenshot of FIG. 47. Coaches/coordinators can select and/or create script names/tags 4701. They can create poll names 4702 and assign plays to poll names 4703.

Figure 48:
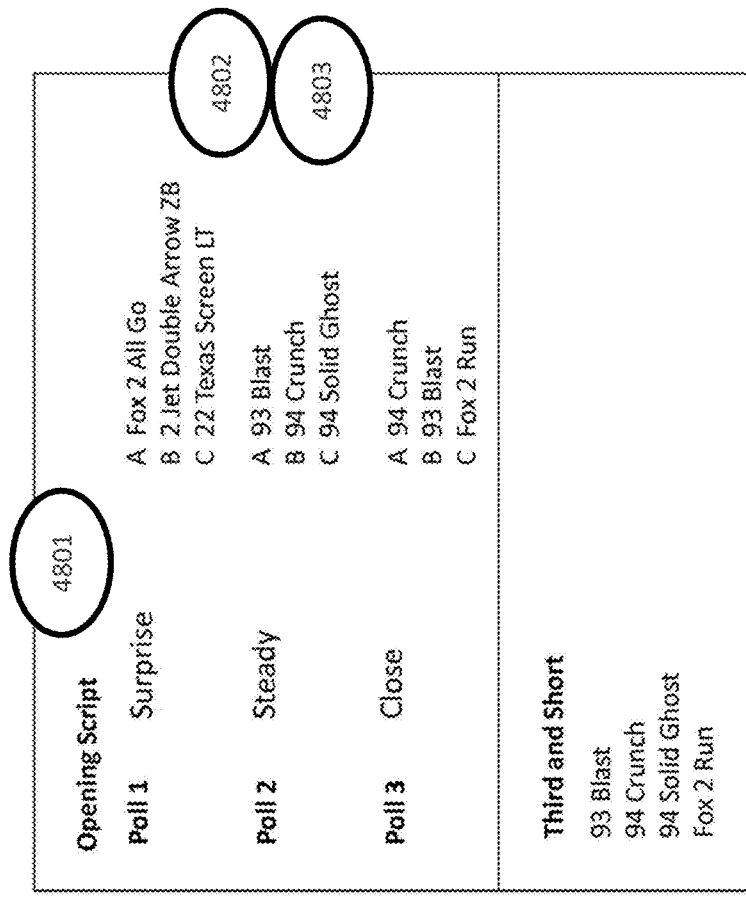

As shown in the exemplary screenshot of FIG. 48, coaches/coordinators can organize and present plays in various fashions 4801, view plays on screen 4802, and print plays for game day 4803.

As shown in the exemplary screenshot of FIG. 49, production team members can manage plays for presentation to fans. They can enter multiple name types for plays 4901 and a fan playbook description 4902, and attach a simple play diagram 4903.

Figure 50:
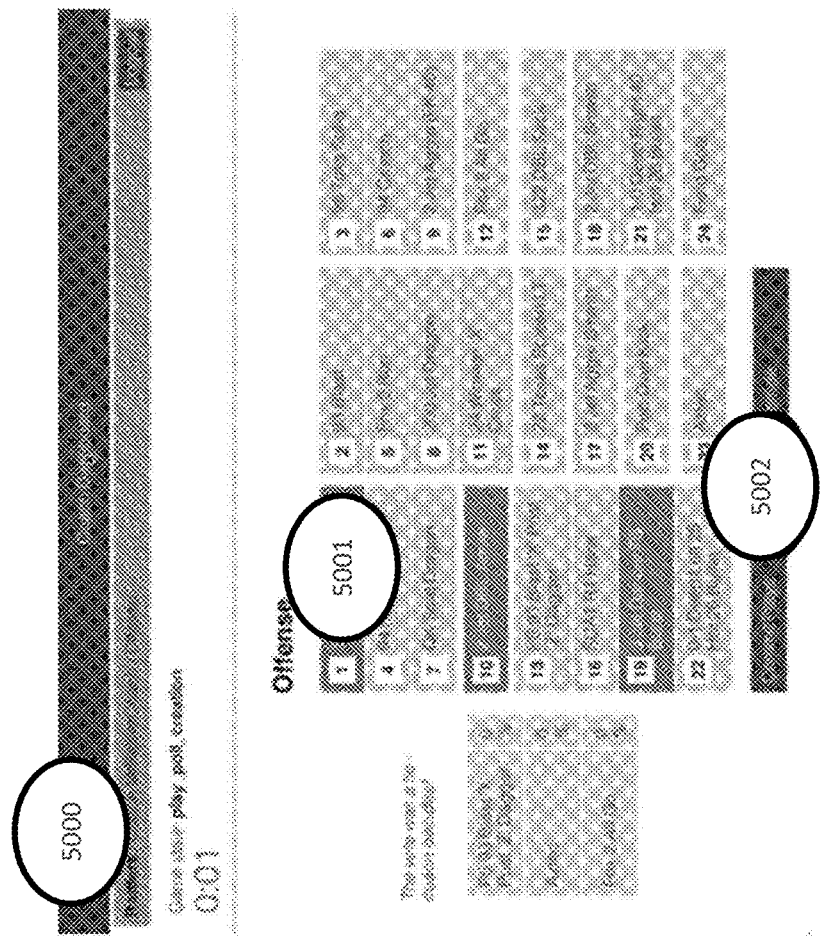
Figure 51:
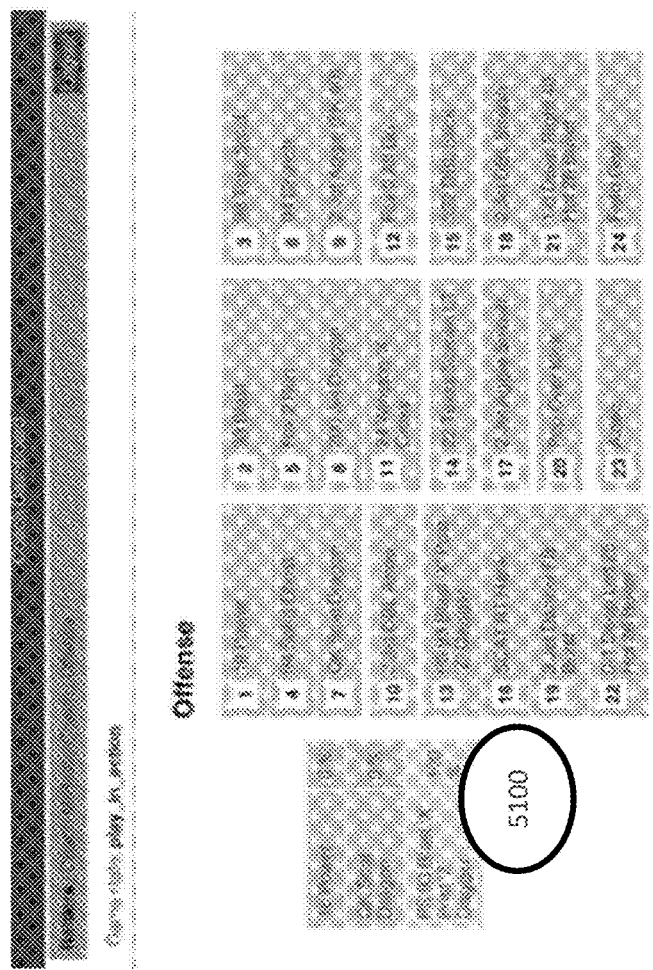

Coaches/coordinators can pick plays to be voted on by fans as shown in the exemplary screenshot of FIG. 50. Coaches/coordinators can access the screen from a unique URL of the coach application 5000. Coaches/coordinators log in, click on 3 plays 5001, and click on a Commit Plays button 5002 to confirm the choice. If no plays are committed, the system automatically assigns 3 plays after a given period of time (e.g., 7 seconds). The Coach receives the play that won the highest percentage of votes 5100 as shown in the exemplary screenshot of FIG. 51.

Figure 52:
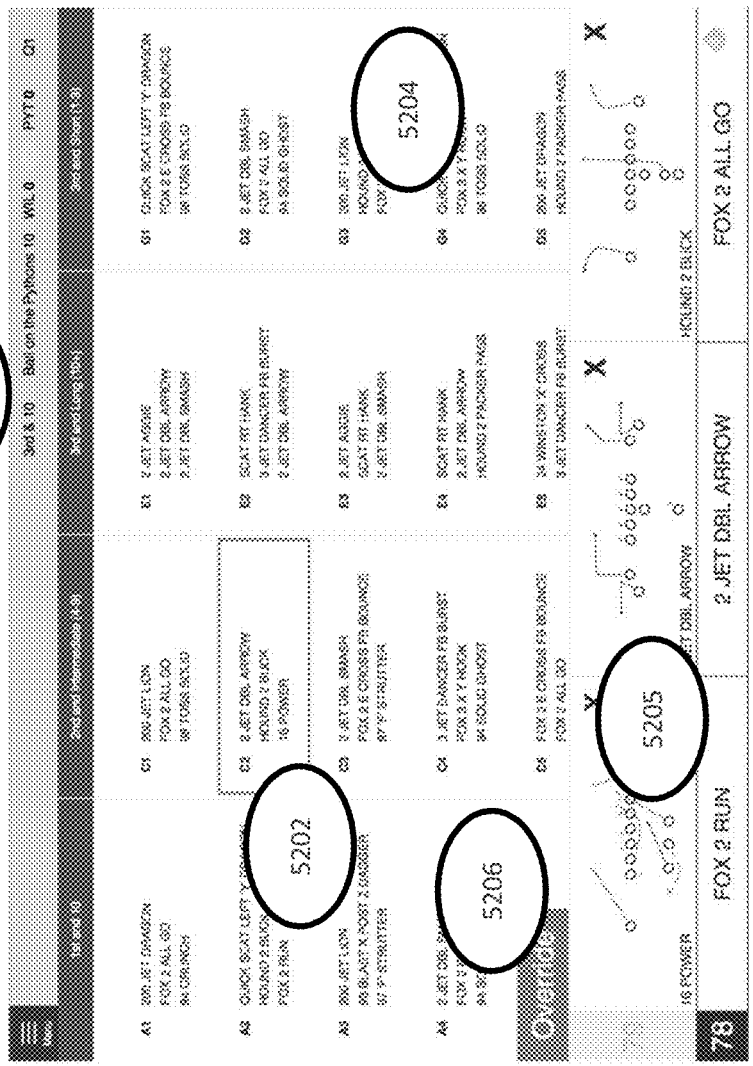

FIG. 52 shows a screenshot of a coach application, according to some embodiments of the present disclosure. Coach application can communicate game status 5200. Game status can include a game quarter, a score, location of the ball, team with possession, and down information. Coach application also allows a coach to choose plays sent to fans 5202. Plays sent to fans can include either pre-defined bundles of plays (e.g., in bundles of three) or individually-selected plays 5204. Coach application can include a visual depiction of selected plays to the coach 5205. Coach application can also allow the coach to override and select a singular play for a number of times a game 5206.

Figure 53:
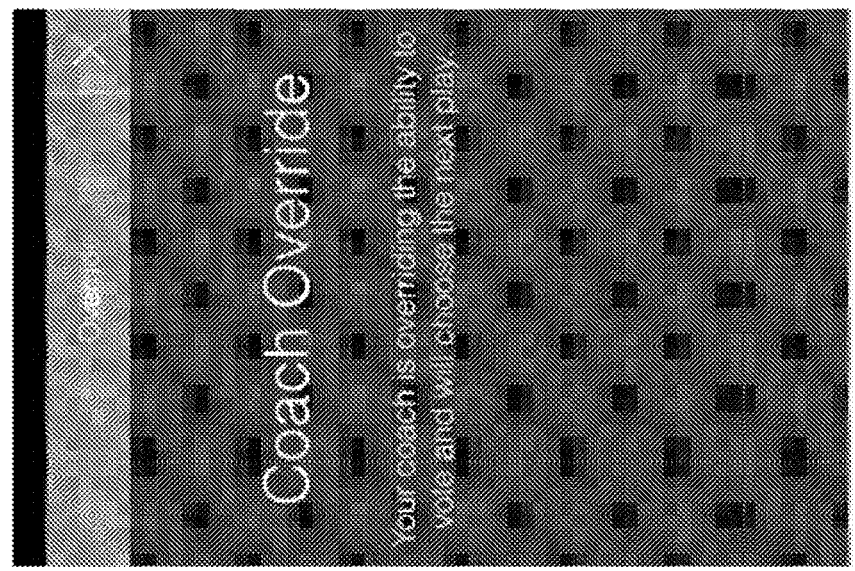

As shown in FIG. 53, in accordance with one or more embodiments, a coach can also elect to override the vote and select the play himself or herself. Coaches can be allowed a certain number of overrides per half (e.g., 4), and users can be notified immediately with a push notification on their device.

Coach Management System

According to some embodiments, a Coach Management System allows coaches to select their plays during games and coordinate other aspects of planning and executing plays during a game. An interface allows coaches to pick a set of plays offered to fans during each play, to see the winning play selected by fans, and to call "overrides" when they have to get their play run.

In some embodiments, the Coach Management System allows football coaches to manage everything about a football team, as described in more detail below. Briefly, a roster module can store the names, profiles, and video of all players. Scouting can keep the profiles and assessments of all potential draftees and opposing players. Medical Manager can track all injuries, readying them for the injury report. Playbook can give coaches a place to create any play they want, to organize each play by any attribute, and to create installs, scripts, and game plans for any situation. Calendar can allow assistant coaches to structure daily coaching plans that roll up into weekly and seasonal plans managed by head coaches. Analytics can allow coaches to understand the performance of all plays by situation, package and player.

Figure 54:
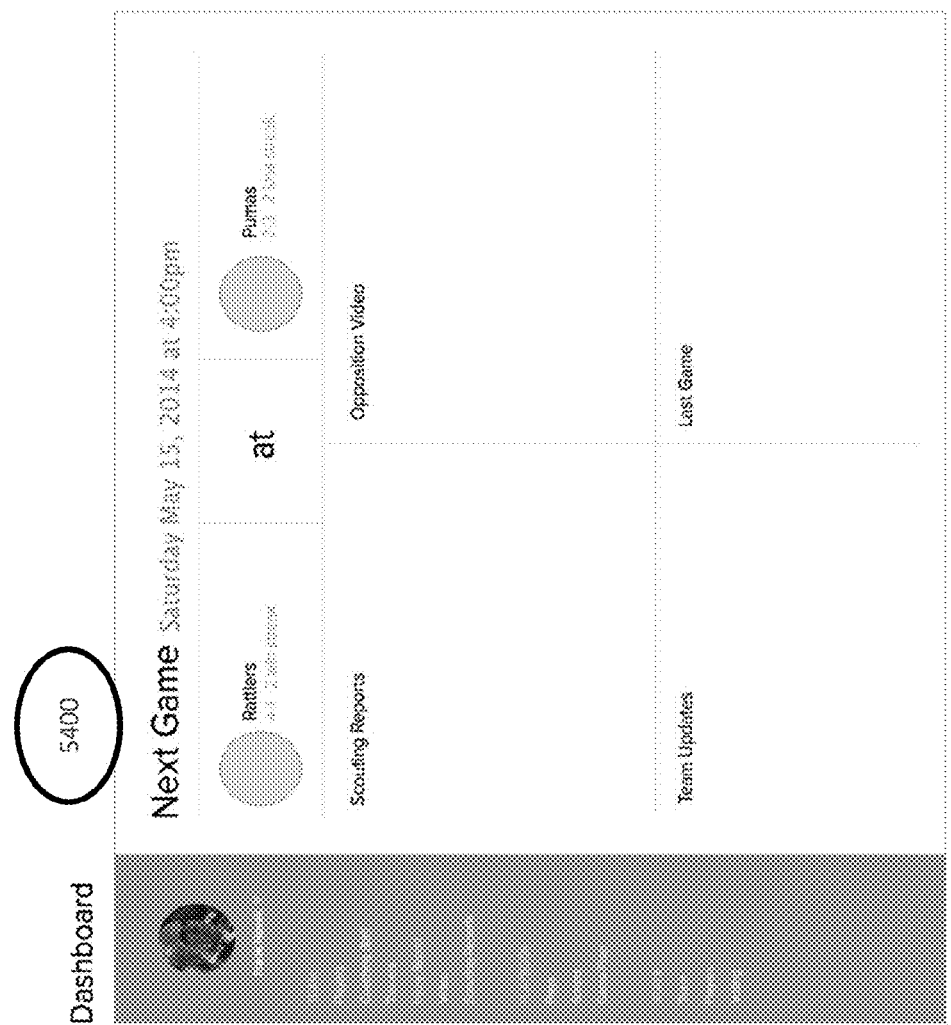

FIG. 54 is a screenshot illustrating a coaching management system overview, according to some embodiments of the present disclosure. The Coaching Management System can enable efficient, data- and system-driven management of most aspects of a football team, including: Personnel management, Playbook management, Game plan management, Player education, Scouting and Injuries 5400. For personnel management, the system will capture past and current of player(s), plays the player partakes in and the performance of that player in given situations—home, away, etc. For Playbook management, the system will capture all aspects of the playbook from individual plays, video links of the play, players associated with the play etc. For Game Plan Management, the system will allow the coaching staff to detail out all aspects of the upcoming opponent and plan out the game by quarter, by player personnel, by situations like down and distance etc. For Scouting and Injuries, the system would like with scouting reports, interface with video footage of scouting sessions and offer real-time insights on injuries directly from the training and strength and conditioning staff.

Figure 55:
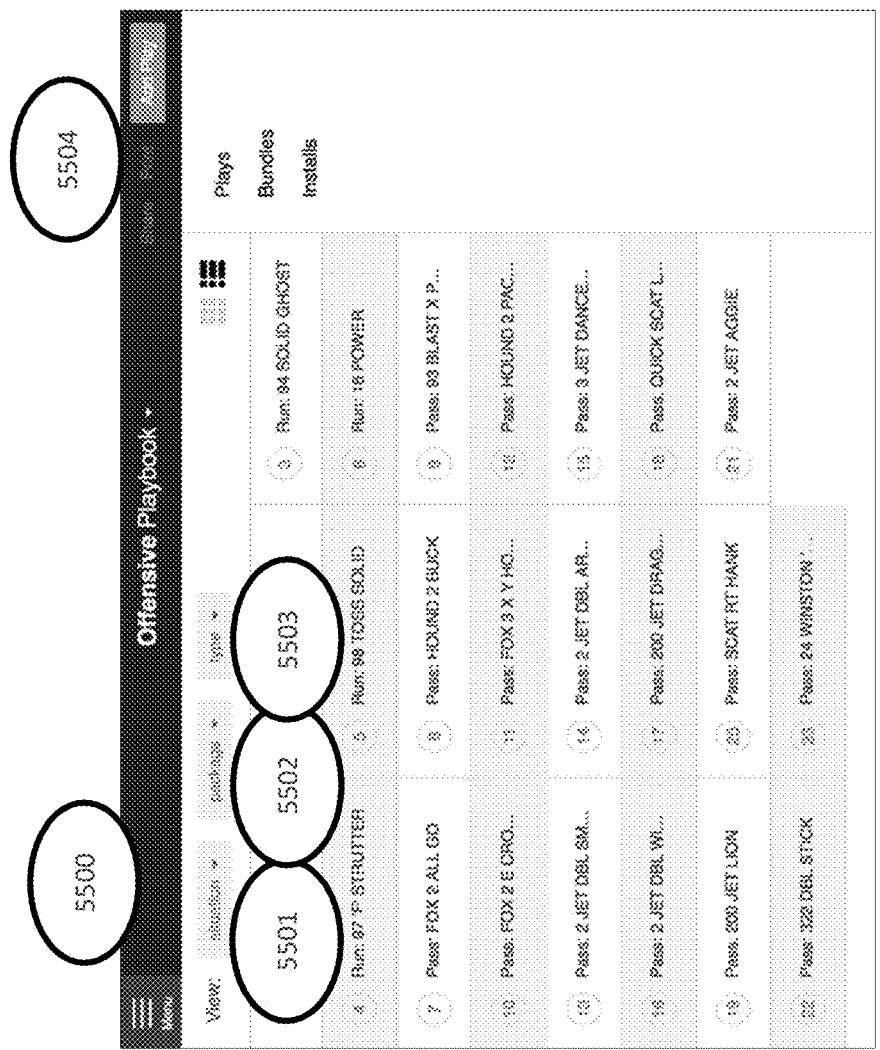

FIG. 55 is a screenshot illustrating a play section within a coaching management system playbook, according to some embodiments of the present disclosure. From the play section, a coach can store plays 5500, filter plays by situation (e.g., down, distance, zone, game time, etc.) 5501, filter plays by package 5502 (an indicator of the number of running backs, tight ends, and receivers on the field), filter plays by type (e.g., run, pass, play action, special teams, etc.) 5503, and add plays 5504. Adding a new play involves entering a play name, illustrating the action of the play, and attaching the appropriate filters to the play.

Figure 56:
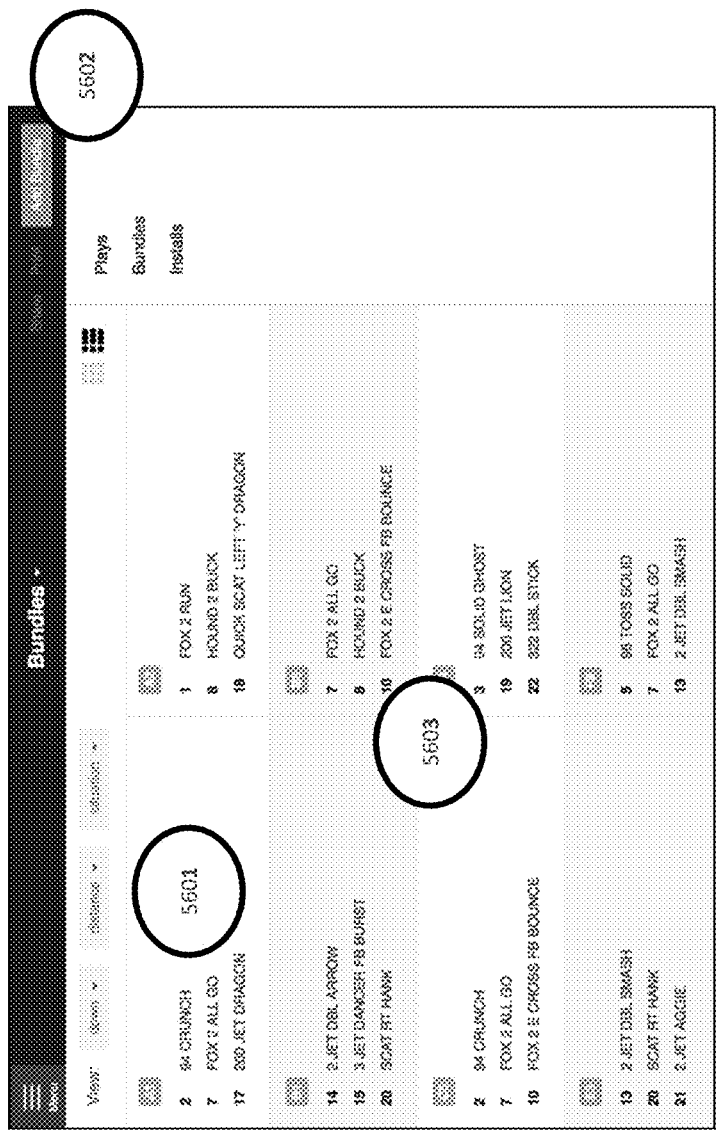

FIG. 56 is a screenshot illustrating a bundles section within a coaching management system playbook, according to some embodiments of the present disclosure. In the bundles section, plays can be organized into bundles of multiple plays (e.g., three plays) that can be selected by a coach 5601. Each bundle represents a reasonable set of plays for a given game scenario—a set that makes sense for the coach and the fan. Organizing plays into bundles makes it easier to present multiple plays to voting fans. The bundles are entered into the system 5602 at the direction of the coach orchestrating the game plan and typically calling the plays. A coach may assign a bundle number such as "R12" 5603 so that it is easier to call plays during a live game.

Figure 57:
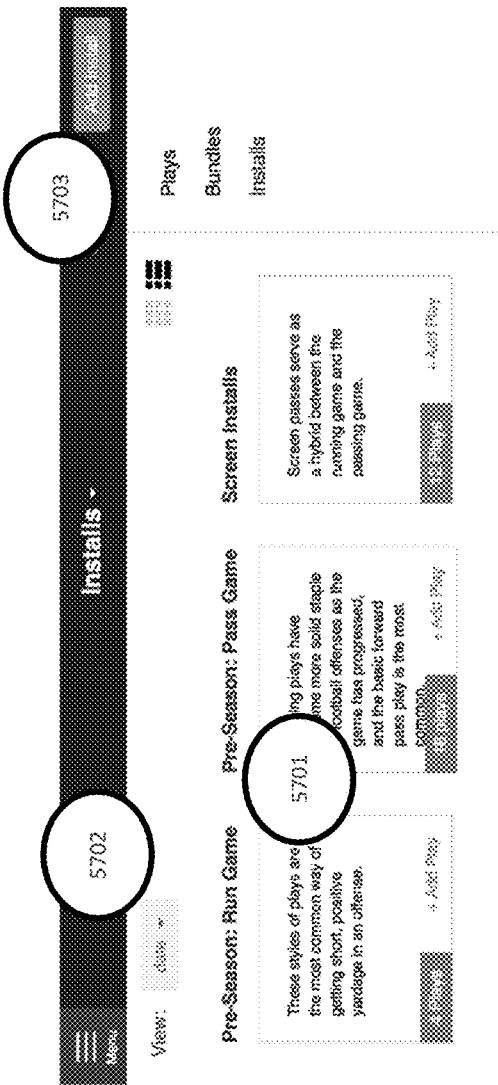

FIG. 57 is a screenshot illustrating an installs section within a coaching management system playbook, according to some embodiments of the present disclosure. In the installs section, plays can be organized into groups of installs. In some embodiments, installs include plays that teams will learn in an upcoming period of time 5701. Installs can be sorted by date 5702 and new installs can be added 5703.

Figure 58:
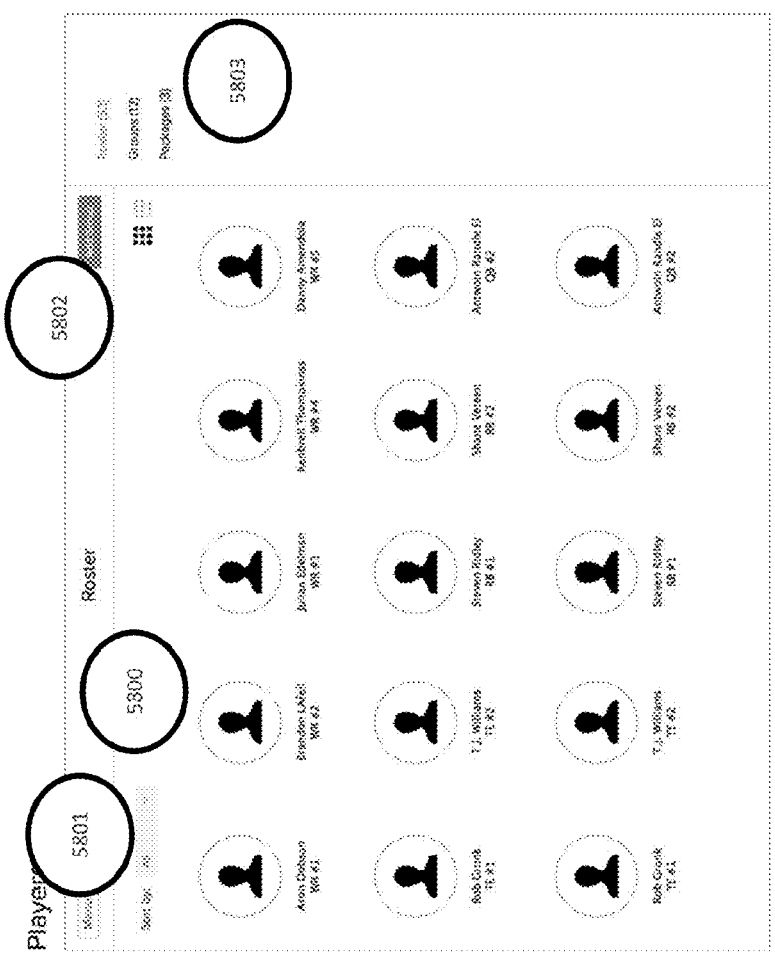
Figure 59:
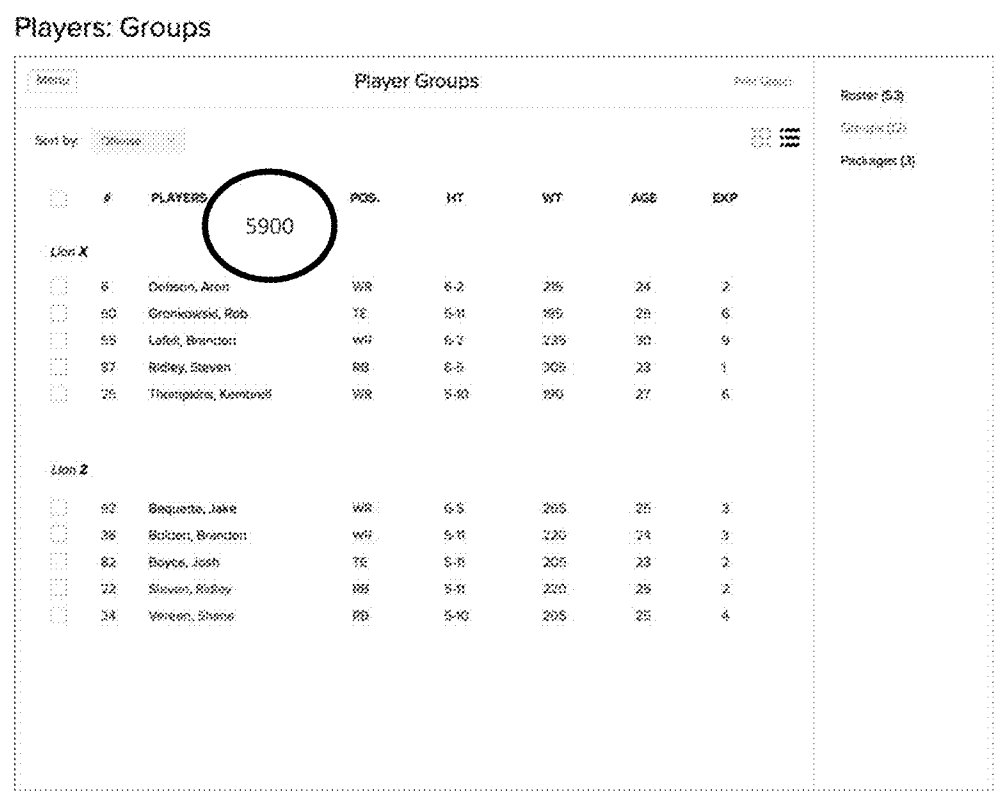
Figure 60:
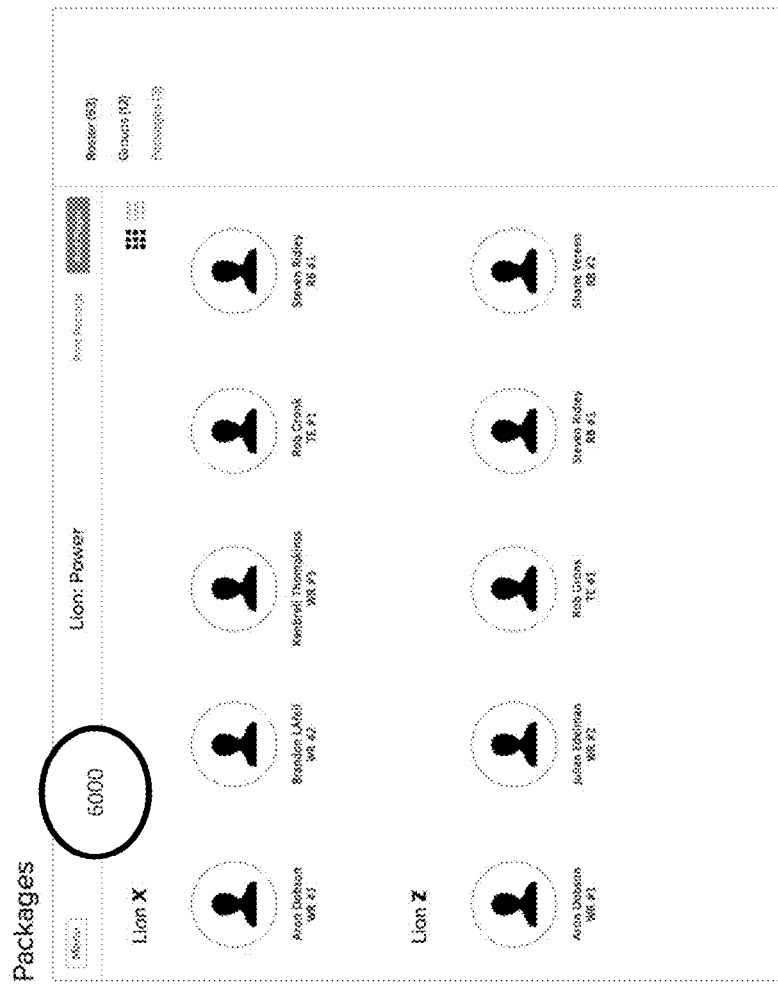

FIG. 58 is a screenshot illustrating a player roster section in a coaching management system, according to some embodiments of the present disclosure. In the roster section, players on the roster can be stored 5800, sorted and searched by various attributes 5801. For example, a member of the coaching staff could sort/filter the players by offense, defense or special teams. Players can be assigned to groups 5802, which indicate the position they play. They can also be assigned to packages 5803, which indicate the number of running backs, tight ends, receivers and other personnel on the field, sometimes called the personnel grouping. Players can be viewed by groups 5900, as shown in the exemplary screenshot of FIG. 59, and by packages 6000, as shown in exemplary screenshot of FIG. 60.

Figure 61:
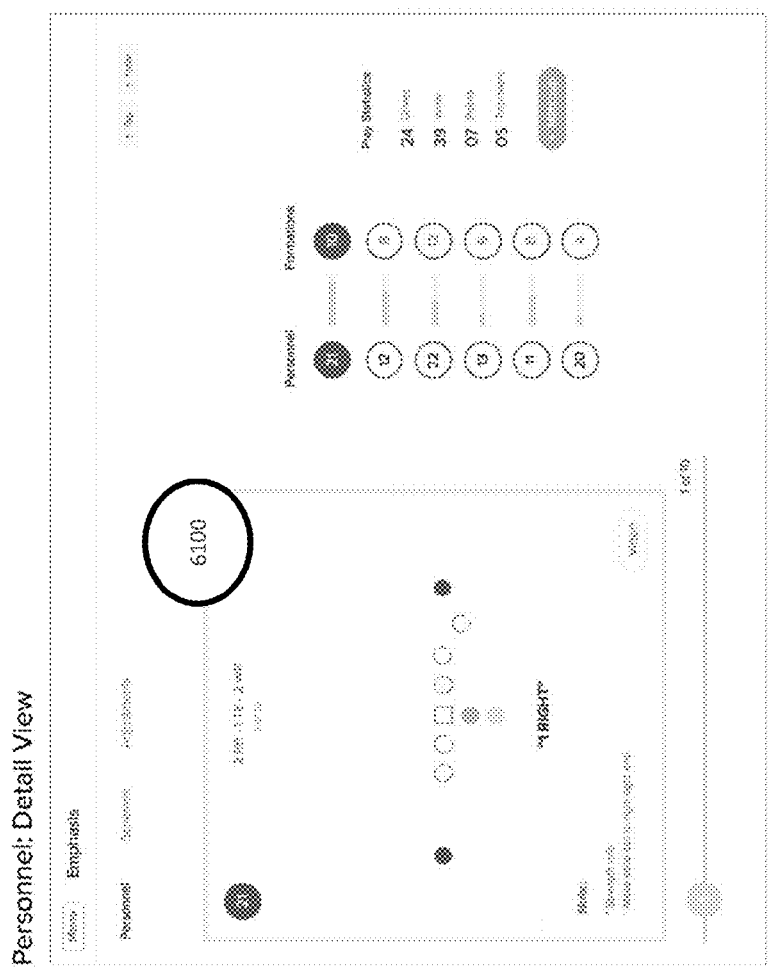

FIG. 61 is a screenshot illustrating a personnel view in a coaching management system, according to some embodiments of the present disclosure. Personnel view includes access to detailed personnel information, such as participation in formations and play statistics 6100.

Figure 62:
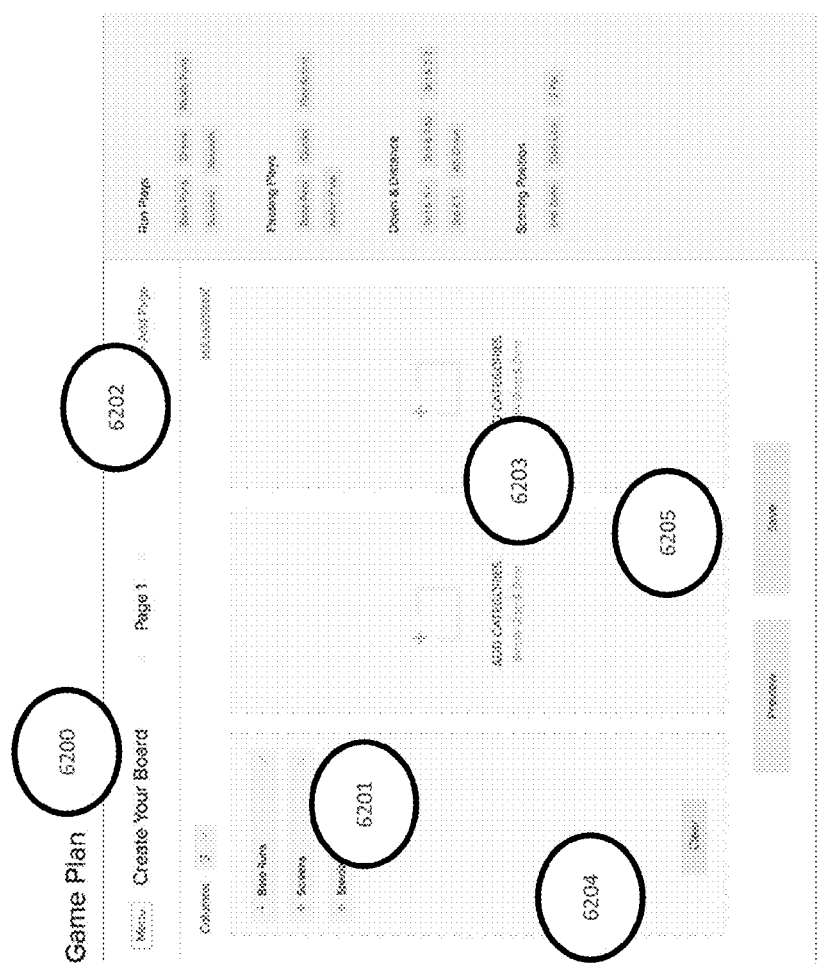

FIG. 62 is a screenshot illustrating a game plan section in a coaching management system, according to some embodiments of the present disclosure. In the game plan section, game plans for an upcoming weekend can be created 6200. Plays can also be selected for a game sheet 6201, pages can be added to a game board 6202, plays can be dragged in or out of a game plan 6203, columns of plays can be cleared 6204, and game plans can be saved 6205. A game plan 6200 is embodied within a game board. A game board is made up of one or more game sheets. A game sheet is made up of multiple scripts 6300, described below, and plays organized by situation.

Figure 63:
Figure 64:
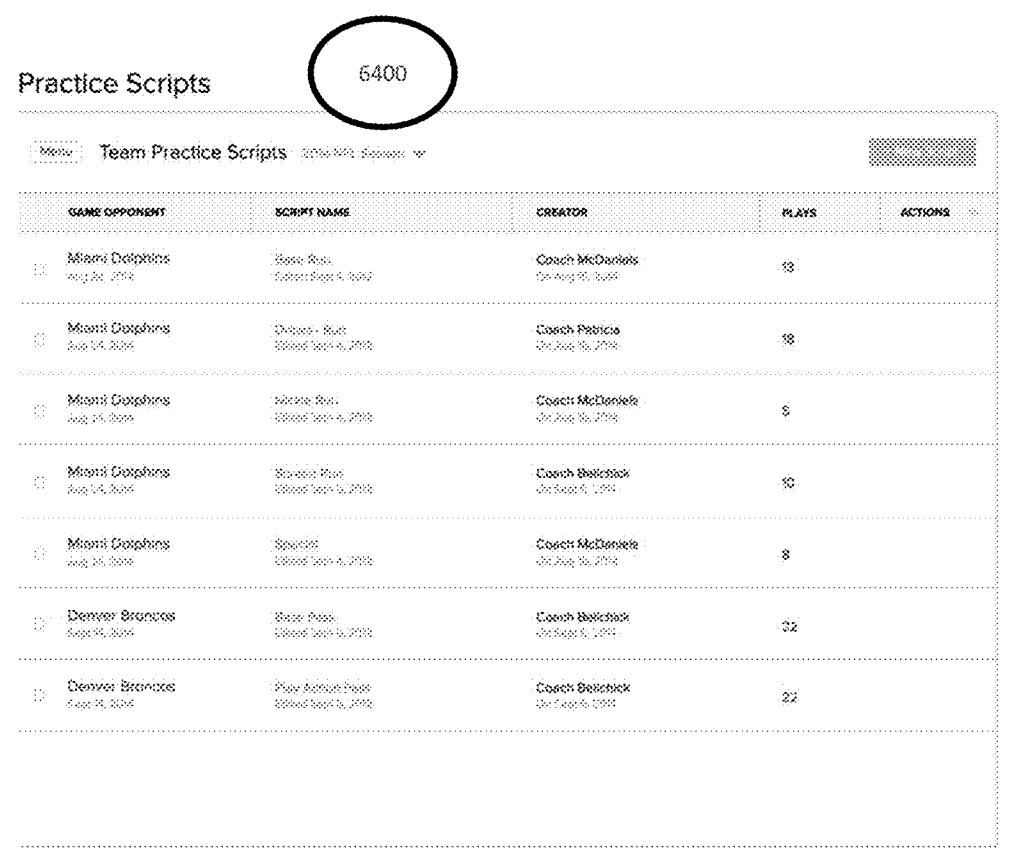

FIG. 63 is a screenshot illustrating script creation in a coaching management system, according to some embodiments of the present disclosure. In some embodiments, a script includes a series of plays run in sequence during specific scenarios: start of game, start of second half, goal line within the five yard line, etc. Plays can be added to a script from other scripts and playlists 6302. Scripts can be created 6300 and assigned to a practice day 6300. Scripts can also be assigned to be practiced for specific game and opponents 6400, as shown in the exemplary screenshot of FIG. 64.

Figure 65:
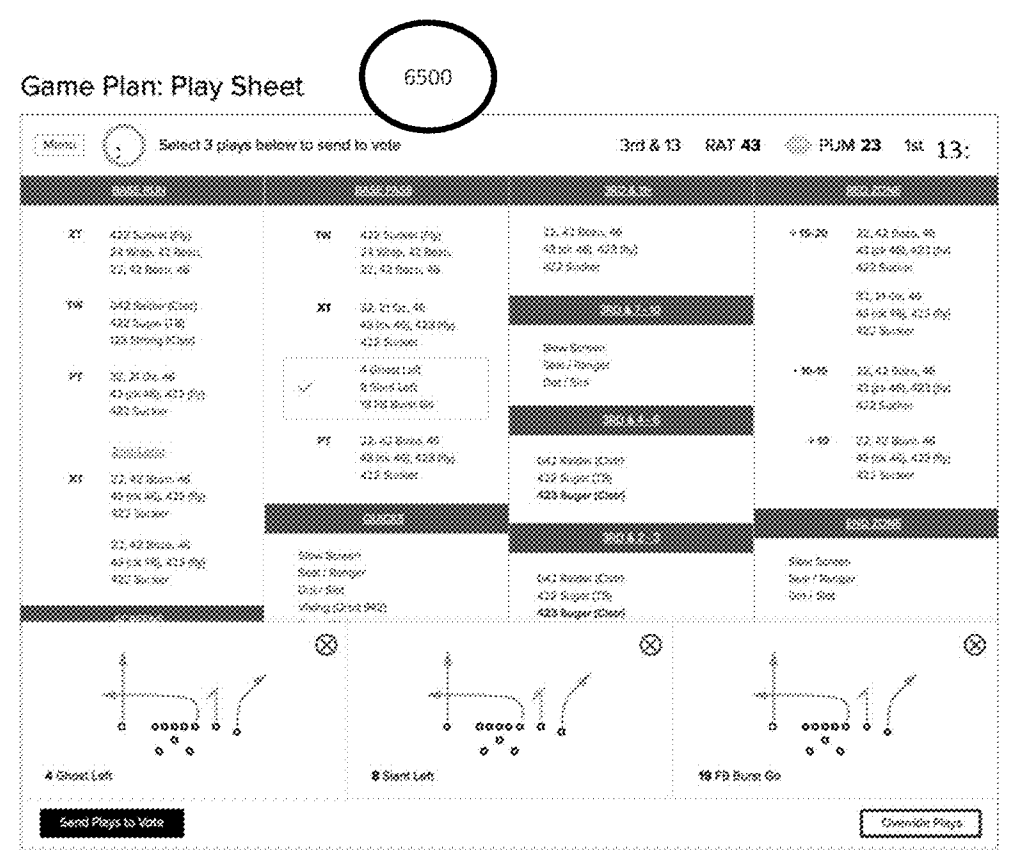

FIG. 65 is a screenshot illustrating a game plan play sheet section in a coaching management system, according to some embodiments of the present disclosure. A play sheet 6500 can be generated that allows quick selection of bundles and plays during a game. For example, a member of the coaching staff can see all of the bundles (sets of plays) for the situation $3^{rd}$ and long. This allows the coaching staff to quickly choose the plays to push out to fans based on the situation on the field.

Figure 66:
Figure 67:
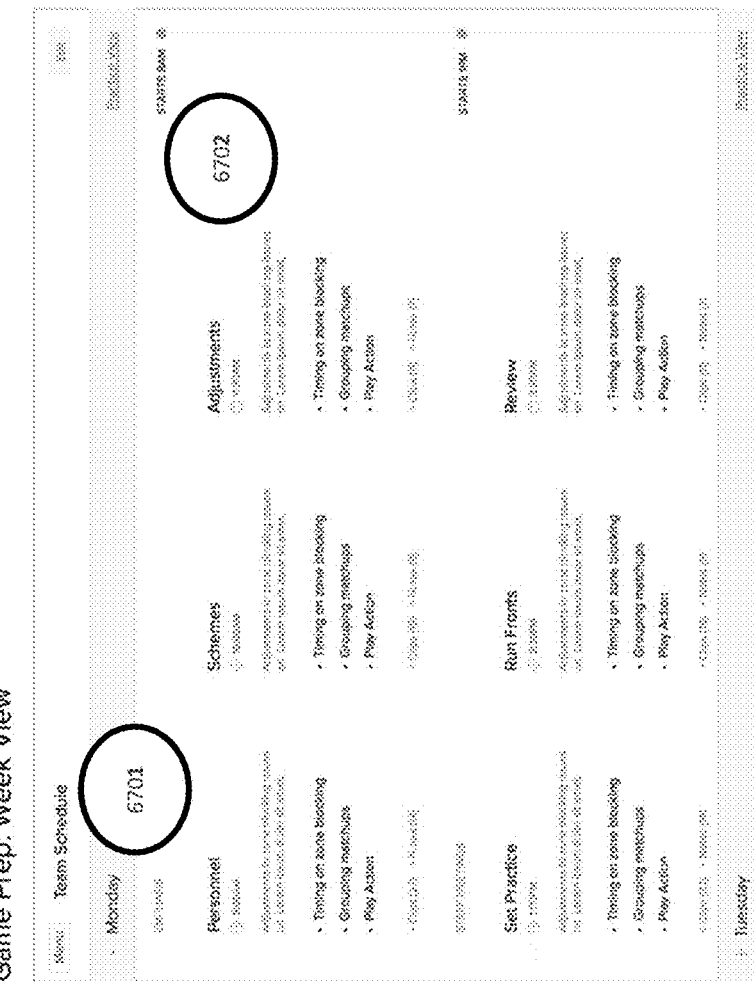
Figure 68:
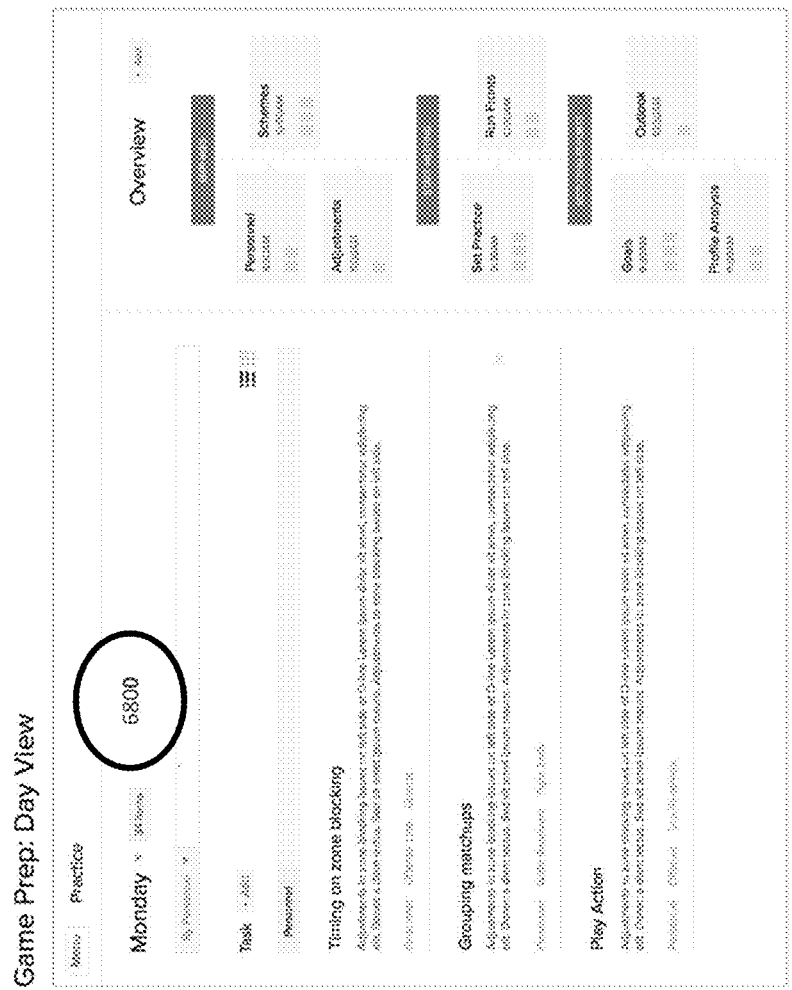

FIG. 66 is a screenshot illustrating a calendar section in a coaching management system, according to some embodiments of the present disclosure. A schedule can be created to install a game plan for a specific game 6600. Game plans can be organized by category 6601, assigned to time slots in a calendar 6602, and organized for viewing by day or week 6603. A schedule can also include a scroll feature to view earlier and later events 6604. Events for the day can also appear in list format to identify points of emphasis for the day 6605. Points of emphasis could mean players on the injury report who won't be reporting to practice, for example. Events can also be viewed by week, as shown in the exemplary screenshot of FIG. 67. A team schedule can be viewed by week 6701 and events can be organized by time slot and emphasis 6702. A team schedule can also be viewed by day 6800, as shown in the exemplary screenshot of FIG. 68.

Figure 69:

FIG. 69 is a screenshot illustrating scouting reports in a coaching management system, according to some embodiments of the present disclosure. Scouting reports can be viewed and sorted by date 6900. Scouting reports can also be created 6901.

Figure 70:
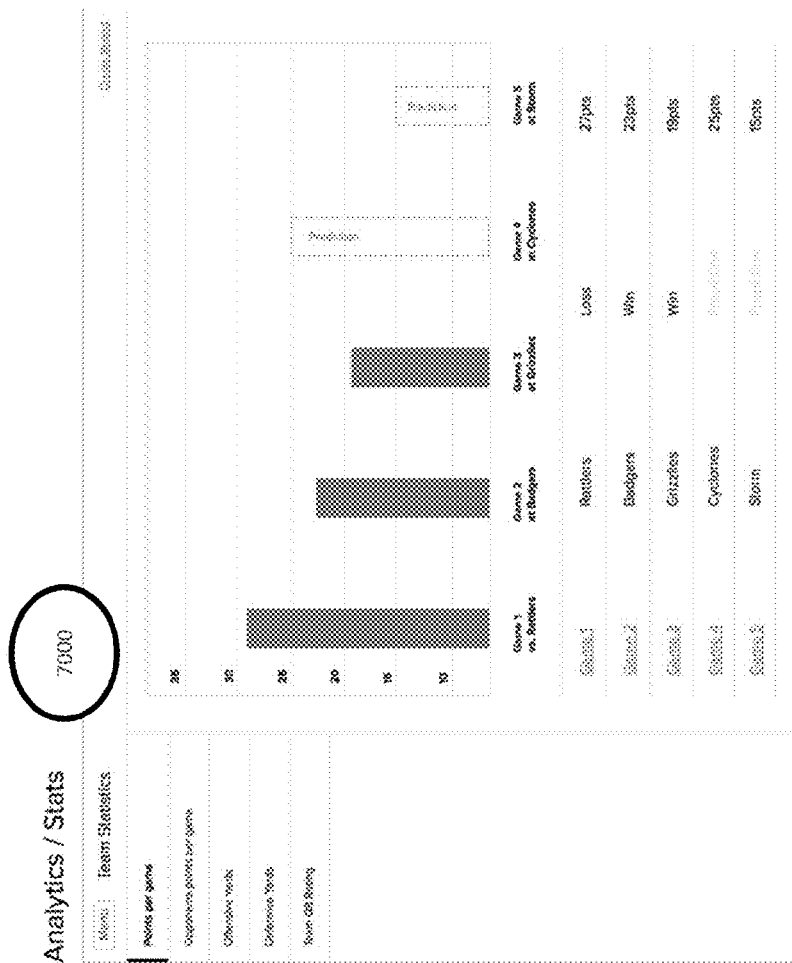

FIG. 70 is a screenshot illustrating analytics in a coaching management system, according to some embodiments of the present disclosure. A variety of analytics reports can be delivered by team, game, opponent, offense, and defense 7000.

Referees/Admin

Figure 71:
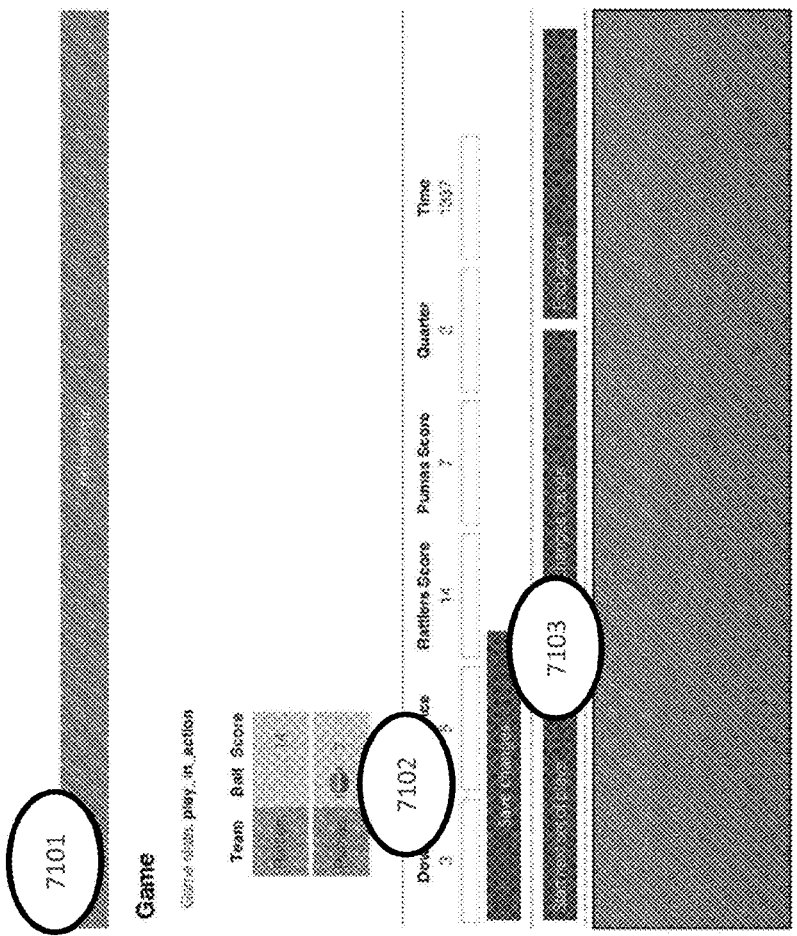

As shown in the exemplary screenshot of FIG. 71, the administrator (admin) can manage a game by accessing the system through a unique URL and login 7101. The admin can enter down, distance, score, quarter, time (and save changes) during a game 7102. The admin can start the next set of plays once the referee (on the field) has placed the ball 7103. At this point, the coaches will receive a notification on their app that they have a set amount of time (e.g., 7 seconds) to input the next set of plays. The admin can also indicate a change in possession as needed, at which time a push notification will be sent out to all users that offense and defense has switched.

Figure 72:
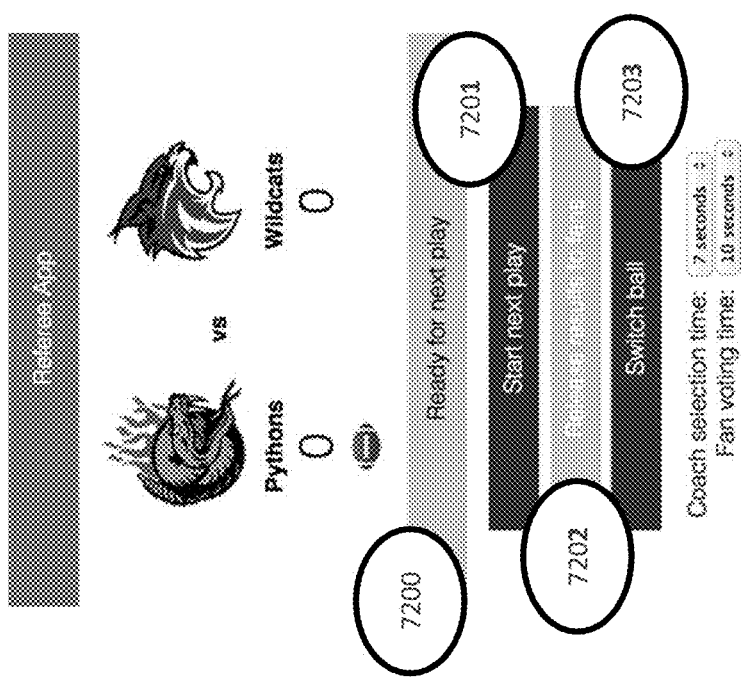

FIG. 72 shows a screenshot of a referee application, according to some embodiments of the present disclosure. A referee application indicates a status of the system. A status of the system is described in more detail below. Briefly, a status of the system can include ready for next play, coaches selecting plays, etc. 7200. A referee application can include a link to initiate a play 7201, to release a winning play (e.g., results of a play) to the fans 7202, and to switch possession of the ball to indicate which team is on offense and defense 7203. There can also include an input to select coach selection time and fan voting time. Coach selection time and fan voting time can define the length of states during a poll, as described in more detail below.

Game Day/Non-Game Day Production Personnel

Production personnel can access the system as shown in the exemplary screenshot of FIG. 73. Production personnel can view participation statistics in real time of concurrent users on the system 7300, send notifications if they are not participating 7301, troubleshoot for technical issues 7302, and alert Marketing/Customer service to flag for retention and participating strategies like rewards, etc. 7303.

Team Product Marketing/Customer Service

Figure 74:
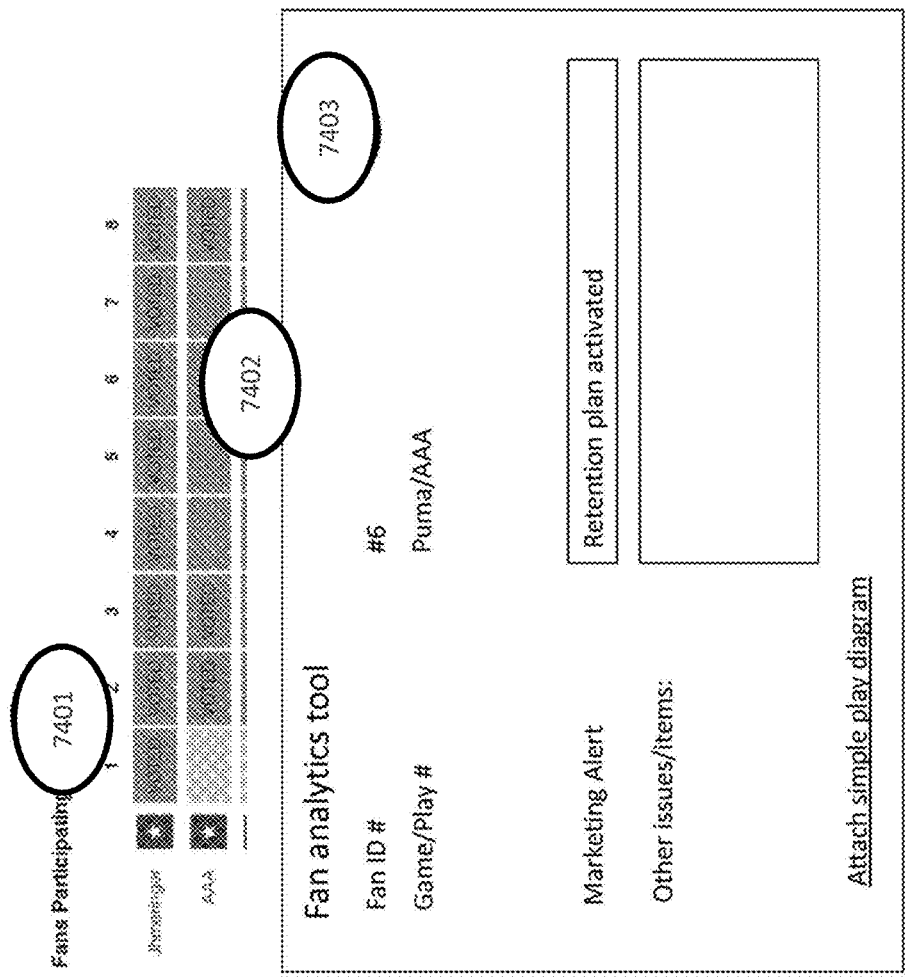

As shown in the exemplary screenshot of FIG. 74, the system allows product marketing/customers service to view participation statistics in real time as well as analyzing data during non-games 7401. They can use data to custom tailor "MyStat" 7402 and MyAchievements" to various fans. They can also tap the fan analytic database to reach out to inactive fans and try to re-engage them and other marketing/service details 7403.

Game Engine: Finite State Machine

Figure 75:
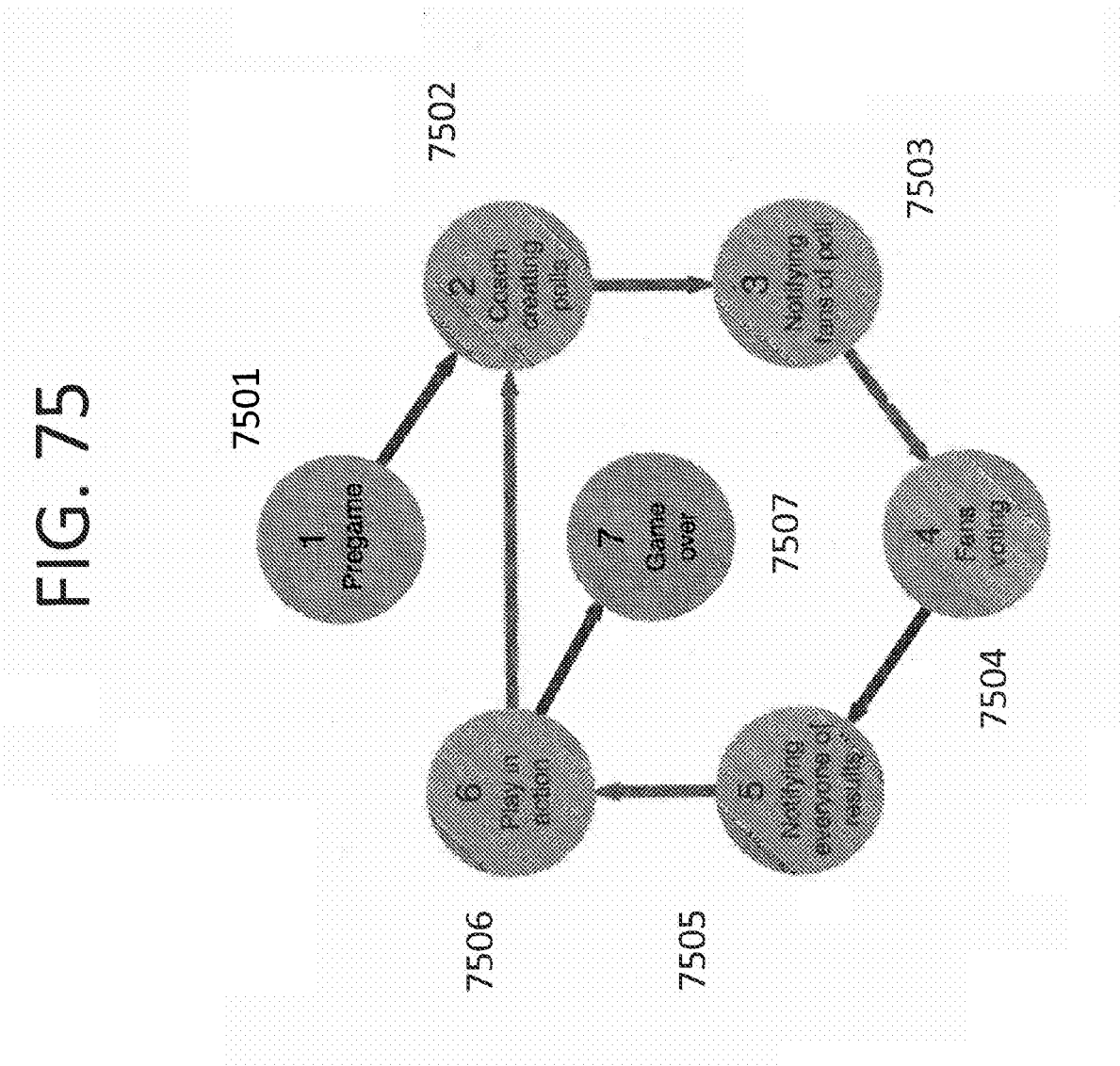
FIG. 75 is a simplified diagram illustrating an exemplary game engine finite state machine, according to some embodiments of the present disclosure.

FIG. 75 illustrates an exemplary finite state machine, according to some embodiments of the present disclosure. The Game Engine is a system for organizing and running an official football game. This includes orchestrating exchanges between the fans, coaches, and referees via a central software solution.

The system is modeled as a finite state machine. This means the system is in exactly one state at any given time. As different actions occur (referee pushing a button, timer completed, etc.) the system moves onto other states. These states define what is possible and occurring at any given moment. The finite machine can be executed by a computing device.

(1) Pregame 7501

When a new game is created and scheduled, its first state is the "pregame" state. The system has been configured with two teams, but the game hasn't actually started yet. In this state users will be able to interact with the game in different ways from when the game is running. This might include interactions/planning with their team coach.

The only action from here that will change the state of the game is having the appropriate official input the command to start the game (via the Admin Application). This will transition the game to the state "coach creating polls".

All states except "pregame" and "game over" are considered to mean the game is currently "active".

(2) Coach Creating Polls 7502

This state means the coaches are currently selecting plays for inclusion in polls that will be sent out to and voted on by fans. Coaches may also submit a "coach override" during this time. In this state, the system accepts play choice options for a poll from the Coach Application. A timer is started which can automatically transition to the "notifying fans of polls" state. The timer can range between 1 second and 60 seconds. In some embodiments, the timer is set for seven seconds.

(3) Notifying Fans of Polls 7503

This state means the system is currently working to send both polls (one for each team) to their fans. In this state, coaches are no longer able to submit play choice options for a poll. A timer is started that will automatically transition to the "fan voting" state. The timer can range between 1 second and 60 seconds. In some embodiments, the timer is set for two seconds. The system verifies that each coach was able to create a poll. If a coach didn't create their poll, the system can create a poll for them and populate it with three random play options. Once both polls are ready they are transmitted to all fans.

(4) Fan Voting 7504

This state means the system is accepting votes from all fans. In this state, the poll sent to the fan in the previous state is made visible now. Vote submissions are now accepted by the system. A timer is started which automatically transitions the game to the "notify everyone of results" state. The timer can range between 1 second and 60 seconds. In some embodiments, the timer is set for ten seconds.

(5) Notifying Users of Results 7505

This state means the system is sending out vote results to all fans and coaches. In this state, votes are no longer accepted by the system. Poll voting results are tabulated and a winning play or a tie is determined for each poll. A summary of each poll results are broadcast to all fans and coaches. A record of the vote summaries is stored for future use. A timer is started which automatically transitions the game to the "play in action" state. The timer can range between 1 second and 60 seconds. In some embodiments, the timer is set for two seconds.

(6) Play in Action 7506

This state means that the winning plays are now being executed on the field by the actual football players. The system is waiting for input via the Admin Application about the final result of the play. Depending on the results, the game can transition into two different states:

1. If the system determines the game is over then the game transitions into the state "game over".
2. If the game is not technically over, then the system waits for a command from an official to start the next entire polling process. This is done by transitioning the game into the "coach creating polls" state again.

(7) Game Over 7507

In this state the game is now over and is no longer capable of going back to any of the other states.

In some embodiments, the total execution time for the first four states is under 100 seconds. In some embodiments, the total execution time is in between 30 and 60 seconds.

The processes of the live-game system described above may be implemented in software, hardware, firmware, or any combination thereof. The processes are preferably implemented in one or more computer programs executing on a programmable computer (which can be part of the computer server system) including a processor, a storage medium readable by the processor (including, e.g., volatile and non-volatile memory and/or storage elements), and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer server system may comprise one or more physical machines, or virtual machines running on one or more physical machines. In addition, the computer server system may comprise a cluster of computers or numerous distributed computers that are connected by the Internet or another network.

Accordingly, the foregoing description and attached drawings are by way of example only, and are not intended to be limiting.

Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology.

Furthermore, an implementation of the communication protocol can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The methods for the communications protocol can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following: a) conversion to another language, code or notation; b) reproduction in a different material form. Significantly, this communication protocol can be embodied in other specific forms without departing from the spirit or essential attributes thereof, and accordingly, reference should be had to the following claims, rather than to the foregoing specification, as indicating the scope of the invention.

The communications protocol has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

We claim:

1. A computerized method of facilitating state-based participation in calling plays in a football game thereby allowing fans to proactively participate in real-time in the game with players, referees and coaches, the method comprising:

receiving, by a computing device, a user profile, the user profile corresponding to a user registered to vote in a real-time football game, the user profile comprising a coach score;

initiating, by the computing device, a sequence of states in response to a start of a play during the real-time football game, the sequence of states comprising:

a poll creation state for a first time period, the poll creation state comprising receiving, by the computing device, a set of plays from a coach computing device at a time corresponding to a time prior to an execution of a play in the real-time football game, each of the set of plays being identical to a play selected by the coach;

a notification state for a second time period, the notification state comprising sending, by the computing device, the set of plays to a registered user computing device in a format such that the sets of plays automatically displays on the registered user computing device;

a fan voting state for a third time period, the fan voting state comprising receiving, by the computing device, a voted play from the registered user computing device, the voted play corresponding to one play from the set of plays;

a notification state for a fourth time period, the notification state comprising sending, by the computing device, a winning play to the registered user computing device and the coach computing device, the winning play based on results of the fan voting state, such that a sum of the first time period, second time period, third time period, and fourth time period is equal to or less than 100 seconds; and a play in action state for a fifth time period, the play in action state comprising receiving, by the computing device, a result of a real-time play based on the winning play from at least one of a referee computing device and an administrator computing device;

when the voted play is the winning play, assigning, by the computing device, points to the voted play based on:
the voted play corresponding to the winning play, and
a real-time score associated with the result of the real-time play;

when the voted play is not the winning play, assigning, by the computing device, points to the voted play when the voted play is a more successful play than the winning play;

updating, by the computing device, the coach score based on the points assigned to the voted play; and outputting, by the computing device, content to the registered user computing device related to the coach score.

2. The computerized method of claim 1, wherein each of the sequence of states terminates upon the start of a subsequent state.

3. The computerized method of claim 1, wherein the set of plays further comprises a coach override, the coach override comprising a winning play selected by the coach.

4. The computerized method of claim 1, wherein the poll creation state further comprises creating at least one of:
a random set of plays,
a set of plays based on prior game statistics, and
a set of plays based on current game statistics,
when the submitted set of plays comprises no plays.

5. The computerized method of claim 1, wherein the content comprises a winning play score, the winning play score corresponding to a number of times a play selected by the user, from the set of plays associated with the poll creation state, is the winning play.

6. The computerized method of claim 5, wherein the content further comprises at least one of a participation score and a scoring play score, the participation score corresponding to a number of plays where the user submits a vote, the scoring play score corresponding to a number of times a play selected by the user results in a team associated with the voting scoring a goal or preventing the scoring of a goal.

7. The computerized method of claim 1, wherein the content comprises at least one of voting information, challenges, and education information, the voting information comprising a record corresponding to how a user earned the coach score, the challenges comprising comparing the coach score with coach scores corresponding to other user profiles, the education information comprising at least one of information and an activity to improve the coach score.

8. The computerized method of claim 1, further comprising sending, by the computing device, state information to the referee computing device.

9. The computerized method of claim 1, further comprising receiving, by the computing device, a duration of at least one of the first time period, second time period, third time period and fourth time period from the referee computing device.

10. The computerized method of claim 1, further comprising outputting, by the computing device, live game information to at least one of the registered user computing device, the coach computing device, and the referee computing device.

11. The computerized method of claim 1, wherein the sum of the time periods ranges from 30 seconds to 60 seconds.

12. A system for facilitating state-based participation in calling plays in a football game thereby allowing fans to proactively participate in real-time in the game with players, referees and coaches, the system comprising memory containing instructions for execution by a processor, the processor configured to:

receive a user profile, the user profile corresponding to a user registered to vote in a real-time football game, the user profile comprising a coach score;

initiate, a sequence of states in response to a start of a play during the real-time football game, the sequence of states comprising:

a poll creation state for a first time period, the poll creation state comprising receiving, by the computing device, a set of plays from a coach computing device at a time corresponding to a time prior to an execution of a play in the real-time football game, each of the set of plays being identical to a play selected by the coach;

a notification state for a second time period, the notification state comprising sending, by the computing device, the set of plays to a registered user computing device in a format such that the sets of plays automatically displays on the registered user computing device;

a fan voting state for a third time period, the fan voting state comprising receiving, by the computing device, a voted play from the registered user computing device, the voted play corresponding to one play from the set of plays;

a notification state for a fourth time period, wherein the processor is further configured to send a winning play to the registered user computing device and the coach computing device, the winning play based on results of the fan voting state, such that a sum of the first time period, second time period, third time period, and fourth time period is equal to or less than 100 seconds; and a play in action state for a fifth time period, wherein the processor is further configured to receive a result of a real-time play based on the winning play from at least one of a referee computing device and an administrator computing device;

when the voted play is the winning play, assign points to the voted play based on:
the voted play corresponding to the winning play, and
a real-time score associated with the result of the real-time play;

when the voted play is not the winning play, assign points to the voted play when the voted play is a more successful play than the winning play;

update the coach score based on the points assigned to the voted play; and output content to the registered user computing device related to the coach score.

13. The system of claim 12, wherein each of the sequence of states terminates upon the start of a subsequent state.

14. The system of claim 12, wherein the set of plays further comprises a coach override, the coach override comprising a winning play selected by the coach.

15. The system of claim 12, wherein for the poll creation state the processor is further configured to create at least one of:
a random set of plays,
a set of plays based on prior game statistics, and a set of plays based on current game statistics,
when the submitted set of plays comprises no plays.

16. The system of claim 1, wherein the content comprises a winning play score, the winning play score corresponding to a number of times a play selected by the user, from the set of plays associated with the poll creation state, is the winning play.

17. The system of claim 16, wherein the content further comprises at least one of a participation score and a scoring play score, the participation score corresponding to a number of plays where the user submits a vote, the scoring play score corresponding to a number of times a play selected by the user results in a team associated with the voting scoring a goal or preventing the scoring of a goal.

18. The system of claim 12, wherein the content comprises at least one of voting information, challenges, and education information, the voting information comprising a record corresponding to how a user earned the coach score, the challenges comprising comparing the coach score with coach scores corresponding to other user profiles, the education information comprising at least one of information and an activity to improve the coach score.

19. The system of claim 12, wherein the processor is further configured to send state information to the referee device.

20. The computerized method of claim 12, wherein the processor is further configured to receive a duration of at least one of the first time period, second time period, third time period and fourth time period from the referee computing device.

* * * * *